US011269072B2

(12) United States Patent
Sowter

(10) Patent No.: US 11,269,072 B2
(45) Date of Patent: Mar. 8, 2022

(54) LAND DEFORMATION MEASUREMENT

(71) Applicant: THE UNIVERSITY OF NOTTINGHAM, Nottingham (GB)

(72) Inventor: Andrew Sowter, Nottingham (GB)

(73) Assignee: THE UNIVERSITY OF NOTTINGHAM, Nottingham (GB)

( * ) Notice: Subject to any disclaimer, the term of this patent is extended or adjusted under 35 U.S.C. 154(b) by 152 days.

(21) Appl. No.: 16/622,653

(22) PCT Filed: Jun. 13, 2018

(86) PCT No.: PCT/GB2018/051622
§ 371 (c)(1),
(2) Date: Dec. 13, 2019

(87) PCT Pub. No.: WO2018/229485
PCT Pub. Date: Dec. 20, 2018

(65) Prior Publication Data
US 2020/0394780 A1 Dec. 17, 2020

(30) Foreign Application Priority Data
Jun. 15, 2017 (GB) ..................................... 1709525

(51) Int. Cl.
*G01S 13/90* (2006.01)
*G06T 7/00* (2017.01)
*G06T 7/60* (2017.01)

(52) U.S. Cl.
CPC ...... *G01S 13/9023* (2013.01); *G01S 13/9027* (2019.05); *G06T 7/0002* (2013.01); *G06T 7/60* (2013.01); *G06T 2207/10044* (2013.01)

(58) Field of Classification Search
CPC ............. G01S 13/9023; G01S 13/9027; G06T 2207/10044; G06T 7/0002; G06T 7/60
See application file for complete search history.

(56) References Cited

U.S. PATENT DOCUMENTS 7,446,705 B1 * 11/2008 Feigl ................... G01S 13/9023 342/357.27
8,711,029 B2 * 4/2014 Ferretti ............... G01S 13/9023 342/25 C

FOREIGN PATENT DOCUMENTS

CN 102608584 A 7/2012
CN 103323848 A 9/2013
(Continued)

OTHER PUBLICATIONS

U.Wegmuller and C.L. Werner, "SAR Interferometric Signatures of Forest", IEEE Transactions on Geoscience and Remote Sensing, vol. 33, No. 5, pp. 1153-1161, Sep. 1995.
(Continued)

*Primary Examiner* — Manuchehr Rahmjoo
(74) *Attorney, Agent, or Firm* — David D. Brush; Westman, Champlin & Koehler, P.A.

(57) ABSTRACT

A method of measuring land deformation over time using interferograms derived from synthetic aperture radar data. The method includes: acquiring radar images covering an area at different points in time; deriving interferograms from pairs of the images, each interferogram measuring phase difference between pixels of a respective pair of images; for each pixel of the interferograms: determining an average coherence value over all of the interferograms; and if the average value is less than a threshold, determining an adjusted average coherence value equal to or above the threshold by excluding one or more of the interferograms below the threshold, provided the number of remaining interferograms is not less than a preset minimum number for each pixel of each interferogram for which the average or adjusted average coherence value is above the threshold, deriving vertical movement from the phase difference; and
(Continued)

deriving the map of land deformation from the vertical movement.

12 Claims, 13 Drawing Sheets

(56) References Cited

FOREIGN PATENT DOCUMENTS

| | | | |
|---|---|---|---|
| CN | 104678392 | A | 6/2015 |
| CN | 104730521 | A | 6/2015 |
| CN | 106204539 | A | 12/2016 |
| WO | 2015008554 | A1 | 1/2015 |

OTHER PUBLICATIONS

J.O. Hagberg, L.M.H. Ulander, J. Askne, "Repeat-Pass SAR Interferometry Over Forested Terrain", IEEE Transactions on Geoscience and Remote Sensing, vol. 33, No. 2, pp. 331-340, Mar. 1995.

H.A.Zebker, J.Villasenor, "Decorrelation in Interferometric Radar Echoes", IEEE Transactions on Geoscience and Remote Sensing, vol. 30, No. 3, pp. 560, May 1992.

J. Askne, M. Santoro, G. Smith, and J. Fransson, Multitemporal "Repeat-Pass SAR Interferometry of Boreal Forests", IEEE Transactions on Geoscience and Remote Sensing, vol. 41, No. 7, Jul. 2003.

P. Berardino, G. Fomaro, R. Lanari, and E. Sansosti, "A new algorithm for surface deformation monitoring based on small baseline differential SAR interferograms", IEEE Trans. Geosci. Remote Sens., vol. 40, No. 11, pp. 2375-2383, Nov. 2002. DOI: 10.1109/TGRS.2002.803792.

T.R. Lauknes, H.A. Zebker and Y. Larsen, "InSAR deformation time series using an L1-norm small-baseline approach", IEEE Trans. Geosci. Remote Sens., vol. 49, No. 1, pp. 536-546, Jan. 2011, DOI: 10.1109/TGRS.2010.2051951.

A. Ferretti, A. Fumagalli, F. Novali, C. Prati, F. Rocca, and A. Rucci, "A New Algorithm for Processing Interferometric Data-Stacks: SqueeSAR", IEEE Trans. Geosci. Remote Sens., vol. 49, No. 9, pp. 3460-3470, Sep. 2011. DOI: 10.1109/TGRS.2011.2124465.

L. Donnelly, "A review of coal mining induced fault reactivation in Great Britain", Quarterly Journal of Engineering Geology and Hydrogeology, vol. 39, pp. 5-50, 2006. DOI: 10.1144/1470-9236/05-015.

D. Gee, A. Sowter, A. Novellino, S. Marsh and J. Gluyas, "Monitoring land motion due to natural gas extraction: Validation of the Intermittent SBAS (ISBAS) DInSAR algorithm over gas fields of North Holland, the Netherlands", Marine and Petroleum Geology 77 (2016) 1338-1354. http://dx.doi.Org/10.1016/j.marpetgeo.2016.08.014.

M. Crosetto, O. Monserrat, N. Adam, A. Parizzi, C. Bremmer, S. Dortland, R. F. Hanssen, and F. J. van Leijen. "Final report of the validation of existing processing chains in Terrafirma stage 2", Terrafirma project, ESRIN/Contract No. 19366/05/I-E. [Online], 2008.

M. Culshaw, D. Tragheim, L. Bateson and L. Donnelly, "Measurement of ground movements in Stoke-on-Trent (UK) using radar interferometry", Proceedings of the 10th IAEG International Congress, Sep. 6-10, 2006, Nottingham, UK.

A. Pepe and R. Lanari, "On the Extension of the Minimum Cost Flow Algorithm for Phase Unwrapping of Multitemporal Differential SAR Interferograms" IEEE Trans. Geosci. Remote Sens., vol. 44, No. 9, pp. 2374-2383, Sep. 2006. DOI 10.1109/TGRS.2006.873207.

L. Bateson, F. Cigna, D. Boon and A. Sowter, "The application of the Intermittent SBAS (ISBAS) InSAR method to the South Wales Coalfield, UK", International Journal of Applied Earth Observation and Geoinformation, vol. 34, Feb. 2015, pp. 249-257. DOI: 10.1016/j.jag.2014.08.018.

D. Massonnet, K. L. Feigl. "Radar interferometry and its application to changes in the earth's surface", Rev. Geophys, vol. 36, No. 4, pp. 441-500, 1998.

M. Crosetto, O. Monserrat, R. Iglesias, and B. Crippa, "Persistent Scatterer Interferometry: potential, limits and initial C- and X-band comparison", Photogram. Eng. Remote Sens., vol. 76, pp. 1061-1069, 2010.

F. Cigna, L. Bateson, C. Jordan, and C. Dashwood. "Simulating SAR geometric distortions and predicting Persistent Scatterer densities for ERS-1/2 and ENVISAT C-band SAR and InSAR applications: nationwide feasibility assessment to monitor the landmass of Great Britain with SAR imagery", Remote Sensing of Environment, vol. 152, pp. 441-466, 2014. DOI: 10.1016/j.rse.2014.06.025.

International Search Report and Written Opinion dated Sep. 7, 2018 for corresponding International Application No. PCT/GB2018/05622, filed Jun. 13, 2018.

Andrew Sowter et al., "DInSAR estimation of land motion using intermittent coherence with applicant to the South Derbyshire and Leicestershire coalfields", Remote Sensing Letters, vol. 4, No. 10, Aug. 20, 2013 (Aug. 20, 2013), pp. 979-987, XP055505413.

GB Search and Exam Report dated Nov. 13, 2017 for corresponding GB Application No. 1709525.8, filed Jun. 15, 2017.

* cited by examiner

LAND DEFORMATION MEASUREMENT

CROSS-REFERENCE TO RELATED APPLICATIONS

This Application is a Section 371 National Stage Application of International Application No. PCT/GB2018/051622, filed Jun. 13, 2018, which is incorporated by reference in its entirety and published as WO 2018/229485 A1 on Dec. 20, 2018, in English.

FIELD OF THE INVENTION

The invention relates to measuring land deformation over time using interferograms derived from synthetic aperture radar data, typically obtained from satellite measurements.

BACKGROUND

Interferometric synthetic aperture radar (InSAR) is a widely used technique for the derivation of topographic maps from two synthetic aperture radar (SAR) observations based upon the phase difference between the two images. Using a technique called Differential InSAR (DInSAR), the projection of changes in target position in the line-of-sight (LOS) between two SAR images acquired at different times can be derived, often to sub-centimetre precision [e.g. Massonnet and Feigl, 1998]. However, a limitation of the DInSAR method is that any temporal change may cause incoherence between the two correlated signals, decreasing the accuracy of the phase measurements. This incoherence is typical of natural features, such as vegetation and bare soil, as they are highly changeable in the period between two SAR images, which can be of the order of anything from a few days to many months [e.g., Zebker and Villasenor, 1992]. The quality of the DInSAR phase is therefore not wholly predictable where the land cover type is dynamic. Some land cover classes, such as urban and rocky terrain, can be consistently stable over long time periods, providing consistently good quality DInSAR phase in all interferograms. These classes provide ideal candidate areas for the long-term monitoring of land motion. This is the basis for the majority of InSAR time-series methods, such as the persistent scatterer interferometry (PSI) [e.g. Crosetto et al., 2010] and the small baseline subset (SBAS) [e.g. Berardino et al., 2002] methods where LOS deformation rates in cities and and areas can be derived to often sub-millimetre precision. This restriction of such techniques to only consistently phase-stable areas is a severe limitation, especially for applications looking at large-scale geological deformation that may extend beyond a city's limits. There have been attempts to develop PSI-related techniques, such as the SqueeSAR method [Ferretti et al., 2011] which is based upon the radar response of distributed targets, to extend the DInSAR method into a wider range of land cover classes. However, there is no current solution that may be applied to all land cover types.

Recently, a method called the intermittent small baseline subset (ISBAS) method has been introduced with the ability to derive high precision rates of deformation from stacks of SAR data. This method can work over a wider range of terrain cover, including both agriculture and forestry [Sowter et al., 2013; Bateson et al.]. The method is, however, still limited in coverage of areas having both stable and variable coherence.

SUMMARY OF THE INVENTION

In accordance with a first aspect of the invention there is provided a method of deriving a map of land deformation from synthetic aperture data, the method comprising:

- acquiring a plurality of synthetic aperture radar images covering an area of interest at different points in time:
- deriving a plurality of interferograms from pairs of the synthetic aperture radar images, each interferogram comprising a measure of phase difference between each pixel of a respective pair of synthetic aperture radar images;
- for each pixel of each of the plurality of interferograms:
  - determining an average coherence value over all of the interferograms; and
  - if the average coherence value is less than a preset coherence threshold, determining an adjusted average coherence value equal to or above the preset coherence threshold by excluding one or more of the interferograms in which the pixel has a coherence value below the preset coherence threshold, provided that the number of remaining interferograms is not less than a preset minimum number of interferograms;
- for each pixel of each interferogram for which the average or adjusted average coherence value is above the preset coherence threshold, deriving a measure of vertical movement from the measure of phase difference; and
- deriving a map of land deformation from the measure of vertical movement for each pixel.

The step of deriving a measure of vertical movement from the measure of phase difference may comprise extracting phase information with respect to a common pixel in the plurality of interferograms for which the average coherence value over all of the interferograms is equal to or above the preset coherence threshold.

The preset minimum number of interferograms may be at least 50, and may be 60 or more.

The preset coherence threshold may be greater than 0.2, and may be 0.25 or more.

The pixels of the plurality of interferograms may each define an average phase difference between groups of pixels in the respective pair of synthetic aperture radar images. The interferograms thereby contain multilooked pixels, the use of which tends to reduce phase noise. The groups of pixels in the pairs of synthetic aperture images may each be in the form of a regular rectangular array. The array may for example be a square array, such as a group of 6×6 pixels in the SAR images.

The step of determining an average coherence value over all of the interferograms may comprise deriving a complex correlation coefficient between pixels of the respective pairs of synthetic aperture radar images for each pixel of each interferogram, the average coherence value over all of the interferograms being an average of the complex correlation coefficients of corresponding pixels from each interferogram.

The plurality of interferograms may include one or more pairs of synthetic aperture radar images taken around 12 months apart, plus or minus 3 months, or multiples thereof, thereby ensuring that a pair of images are taken at roughly the same time of year, increasing the possibility of coherence between the images.

The step of determining an adjusted average coherence value equal to or above the preset coherence threshold may comprise repeating the step of determining an average coherence value after excluding the interferogram in which the pixel has the lowest coherence value until the average coherence value is above the preset coherence threshold or until the number of remaining interferograms is less than a preset minimum number of interferograms.

The measure of vertical movement from the measure of phase difference may be derived with reference to a pixel having an average coherence value over all of the interferograms above the preset coherence threshold. This reference pixel may, for example, be a location having an independently calculated vertical movement, or may be a location having a stable coherence over time.

An advantage of the invention is that coverage can be extended beyond what would otherwise be possible, through using an increased number of data points from which vertical movement can be determined. This tends to come at the expense of increased errors, with higher errors associated with intermittently coherent solutions, but a trade-off between coverage and the preset minimum number of interferograms can result in useful maps of land deformation that cover areas that could otherwise not be mapped using standard DInSAR techniques.

The methods described herein allow the commonly-used SBAS method to be adapted to provide linear and non-linear components of land deformation over a much wider range of land cover classes using stacks of SAR images. The general method, which may conveniently be termed Intermittent SBAS (ISBAS) uses the intermittent nature of coherence of non-urban targets to form unique solutions for every multilooked pixel. Short baseline pairs are formed between SAR images which are combined to form average velocities and, where the network of observations is sufficient, they may be adjusted to form time series for the points.

The main benefits of the method may be summarized as follows:

1. Increased point density over a wider range of land cover classes. The use of intermittent coherence dramatically increases the number of observations of LOS velocity and allows calculation over the full range of land cover types. This allows a better characterization of deformation, especially when linked to geology, and allows the identification of deformation events that generally are depicted only with difficulty by conventional SBAS, such as landslides, that exist primarily in rural areas.

2. Wide area coverage. An increased density of points in vegetated regions allows the phase unwrapping process to ‘bridge’ between urban areas and connect areas that were previously disconnected in an SBAS analysis. It may be applied routinely to complete overlaps between images. Thus, ISBAS is a solution to the InSAR processing of wide areas which enables large regions to be monitored more effectively.

3. Directly comparable with SBAS. In urban and rocky terrain, where coherence between pixels at different times is generally consistently high, the ISBAS solution should be almost identical to the SBAS solution because the same interferograms are used consistently and in the same fashion.

The main source of errors for the ISBAS method relate to the number of interferograms used because the standard error of LOS velocity is related to the number of observations and so a greater number implies greater confidence. In this way, the minimum number of interferograms used, an important parameter for ISBAS, should be as large as possible whilst also giving the best possible point coverage.

In accordance with a second aspect of the invention there is provided a computer program comprising instructions that, when executed, cause a computer to perform the method according to the first aspect of the invention. The computer program may be stored on a non-transitory computer readable medium such as a magnetic or optical based hard drive or a non-volatile memory.

DETAILED DESCRIPTION

The invention is described in further detail below by way of example and with reference to the accompanying drawings, in which:

FIGS. 1*a* and 1*b* are schematic plots identifying four SAR images in terms of their orbital baseline and temporal baseline, arranged as a Delauney triangulation (FIG. 1*a*) and as coherent pairs (FIG. 1*b*);

Figure 5:
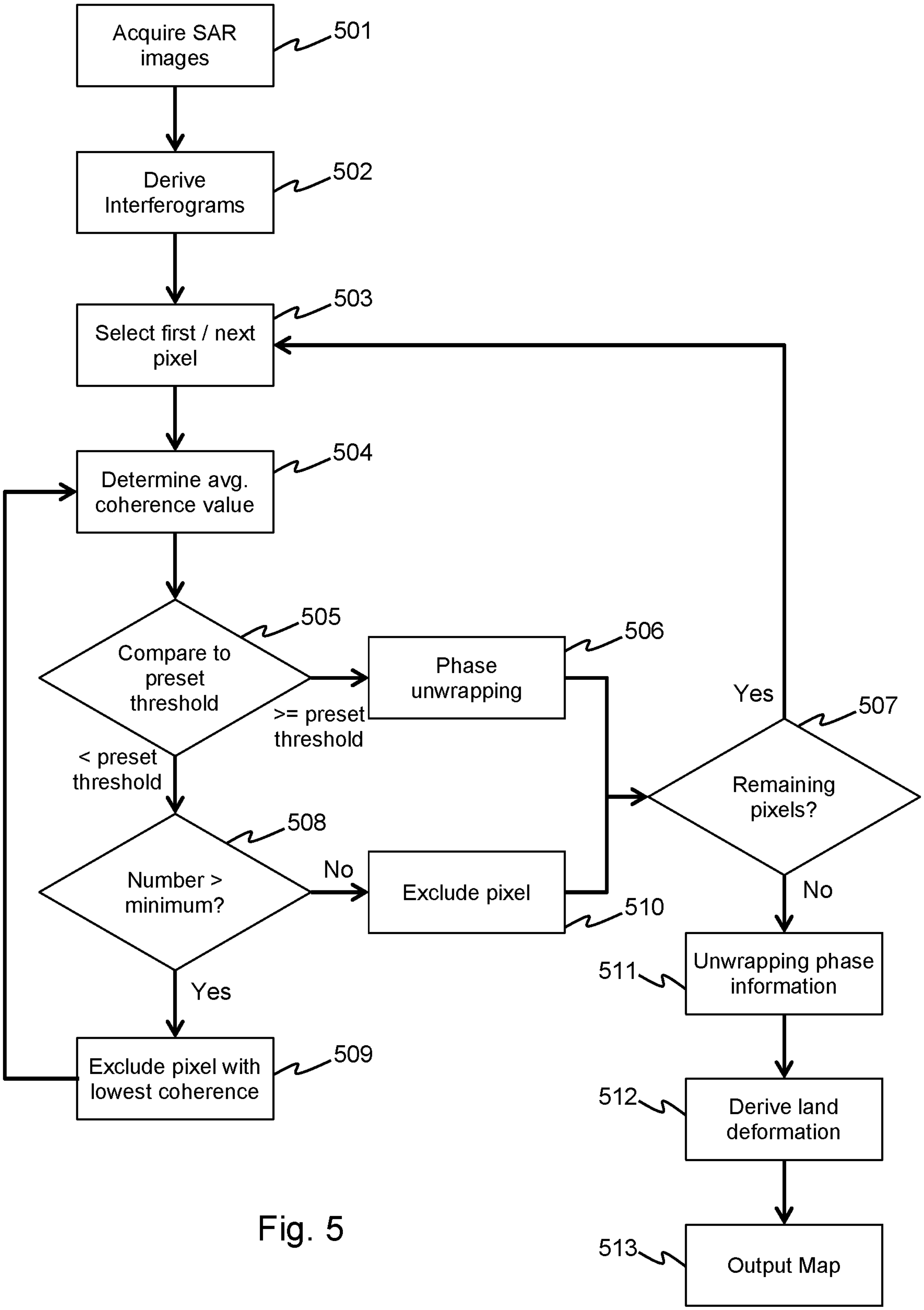
Figure 6:
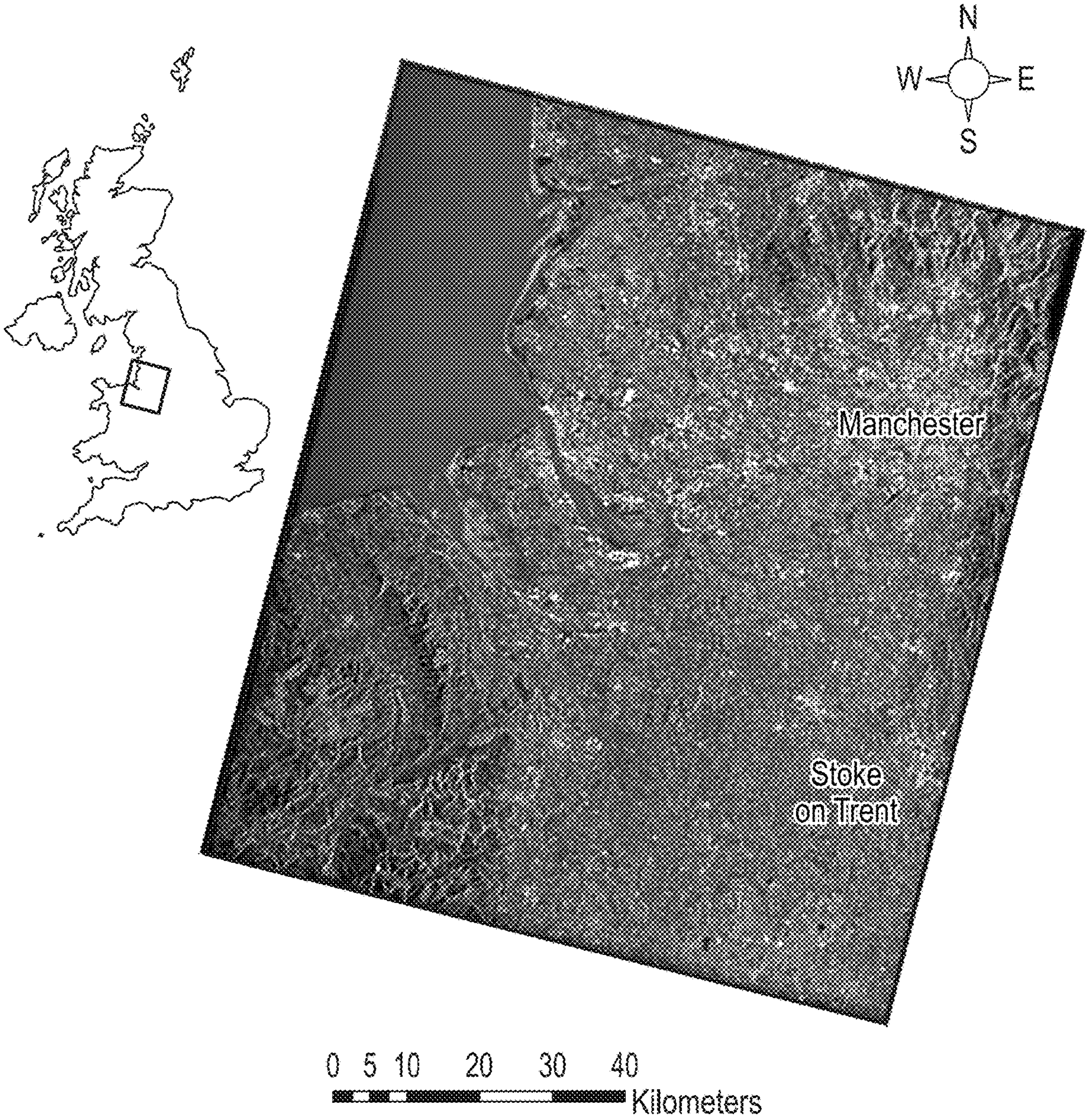
Figure 7:
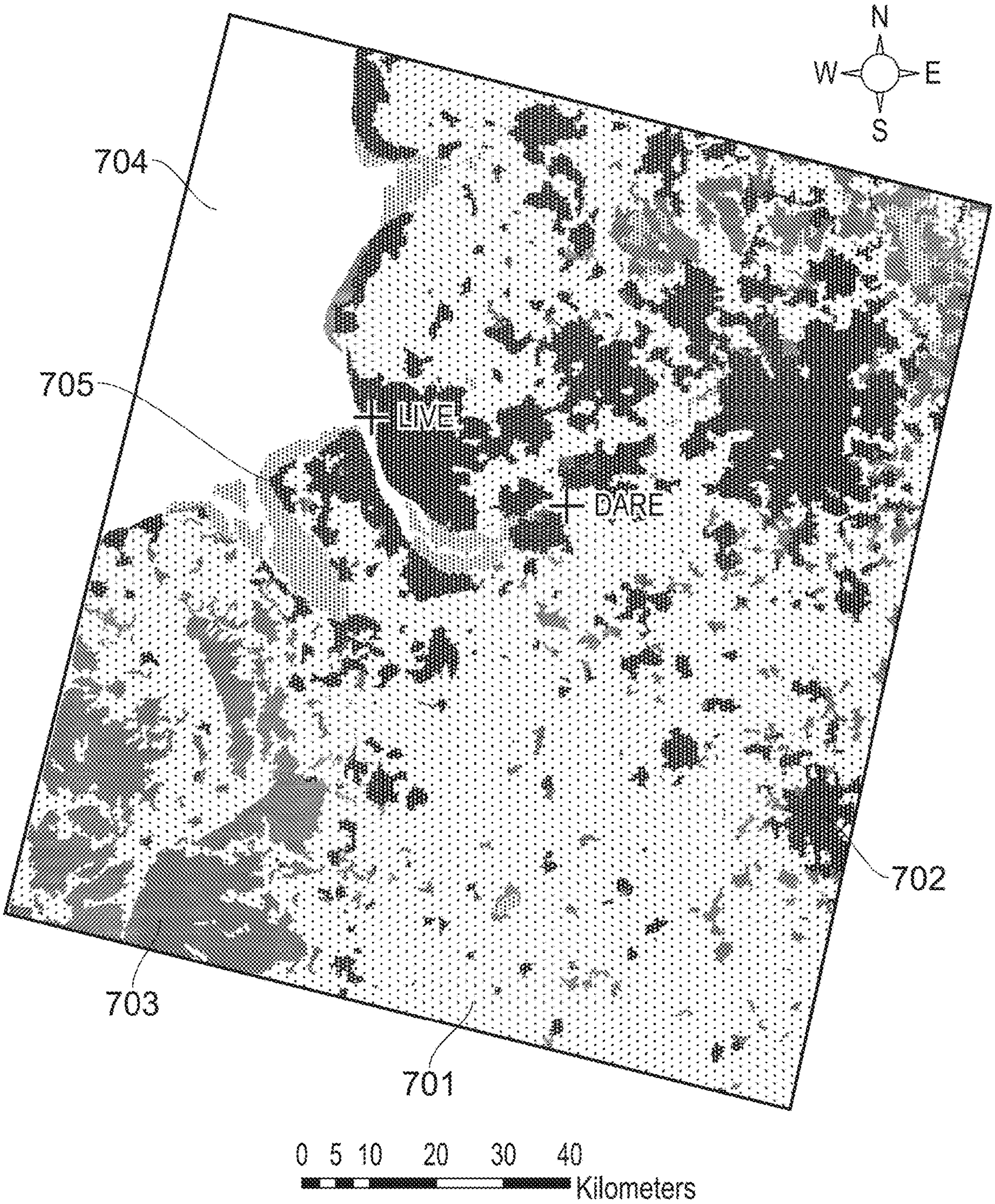
Figure 8:
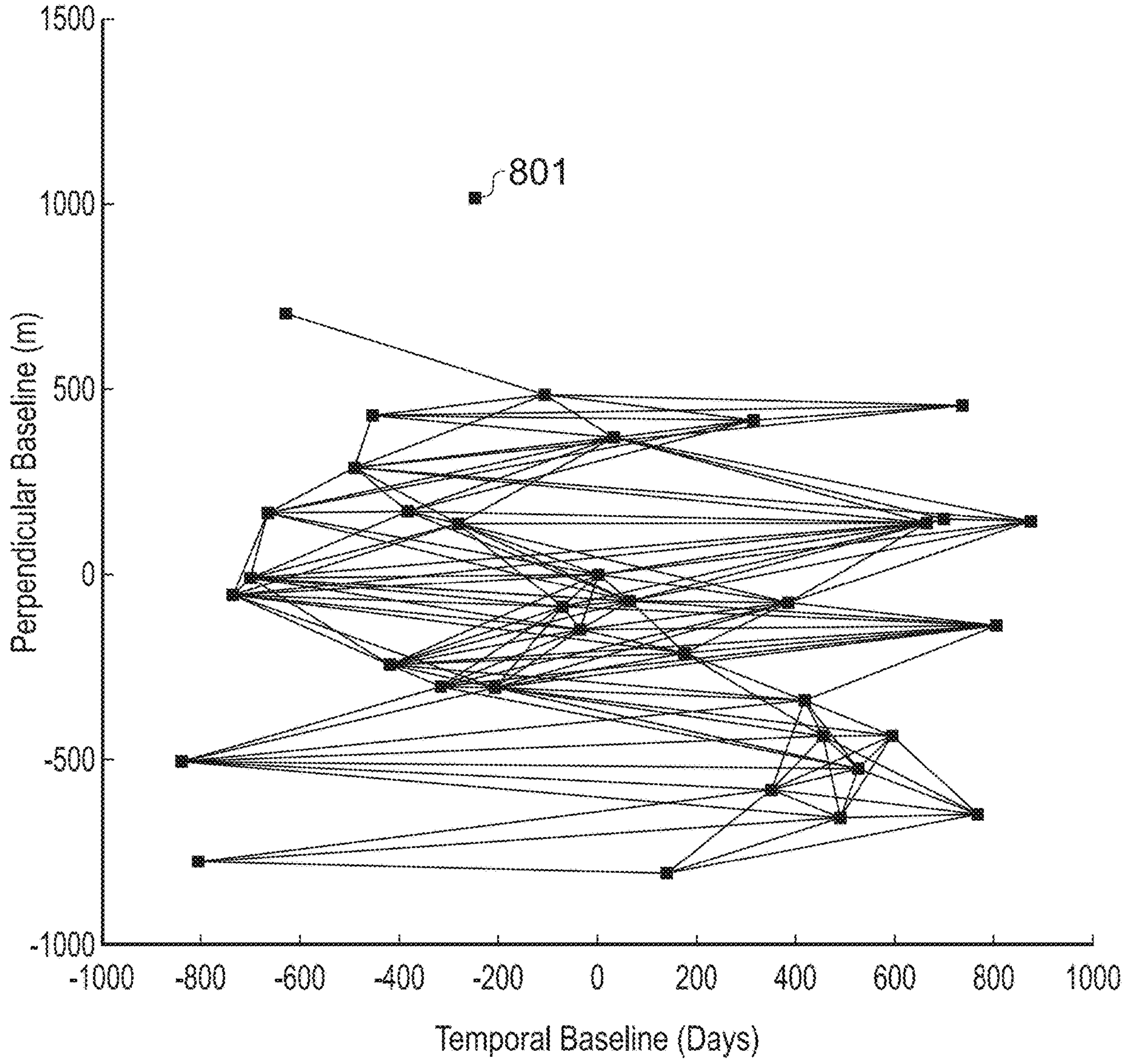
Figures 9A, 9B:
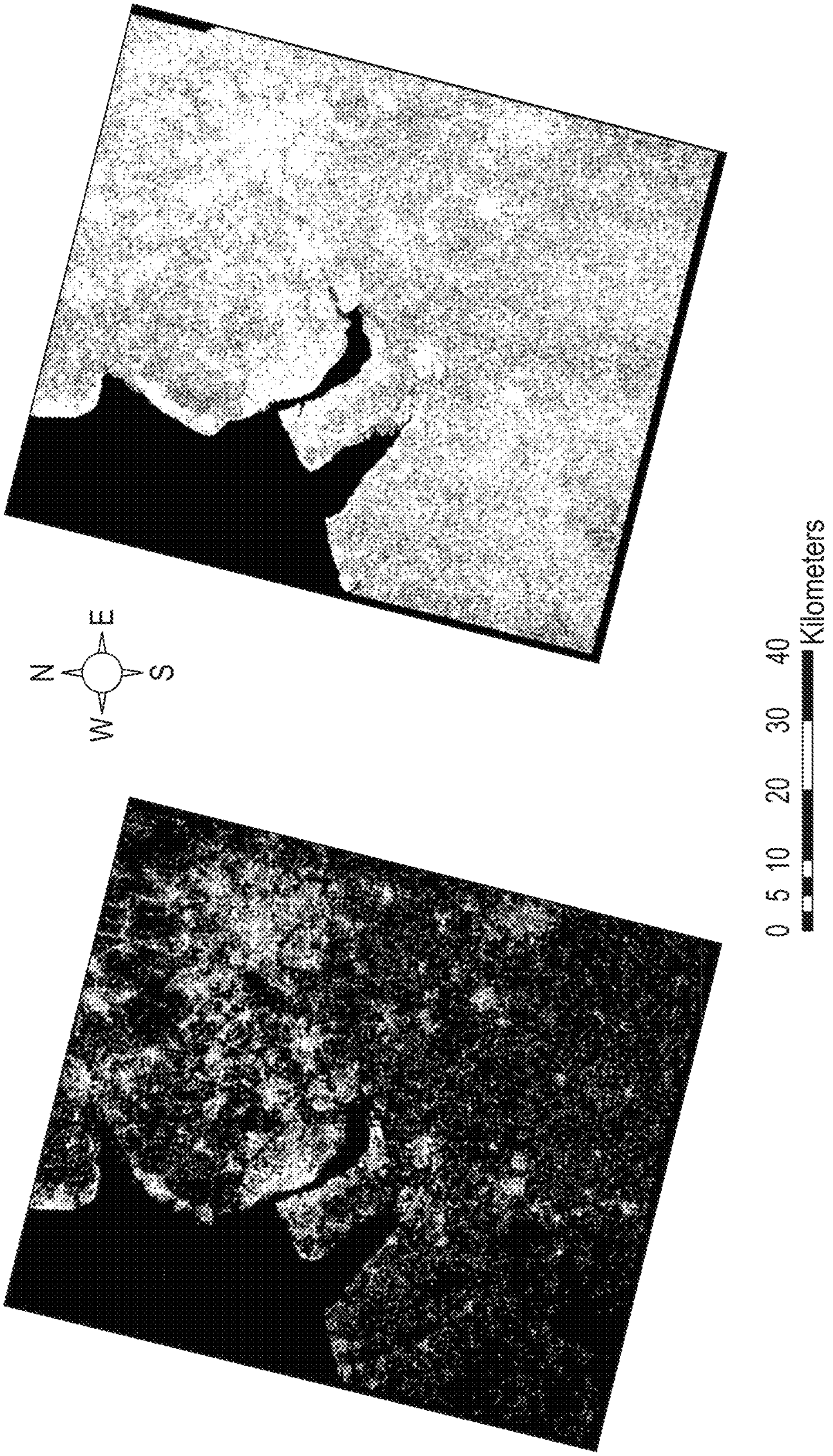
Figure 10:
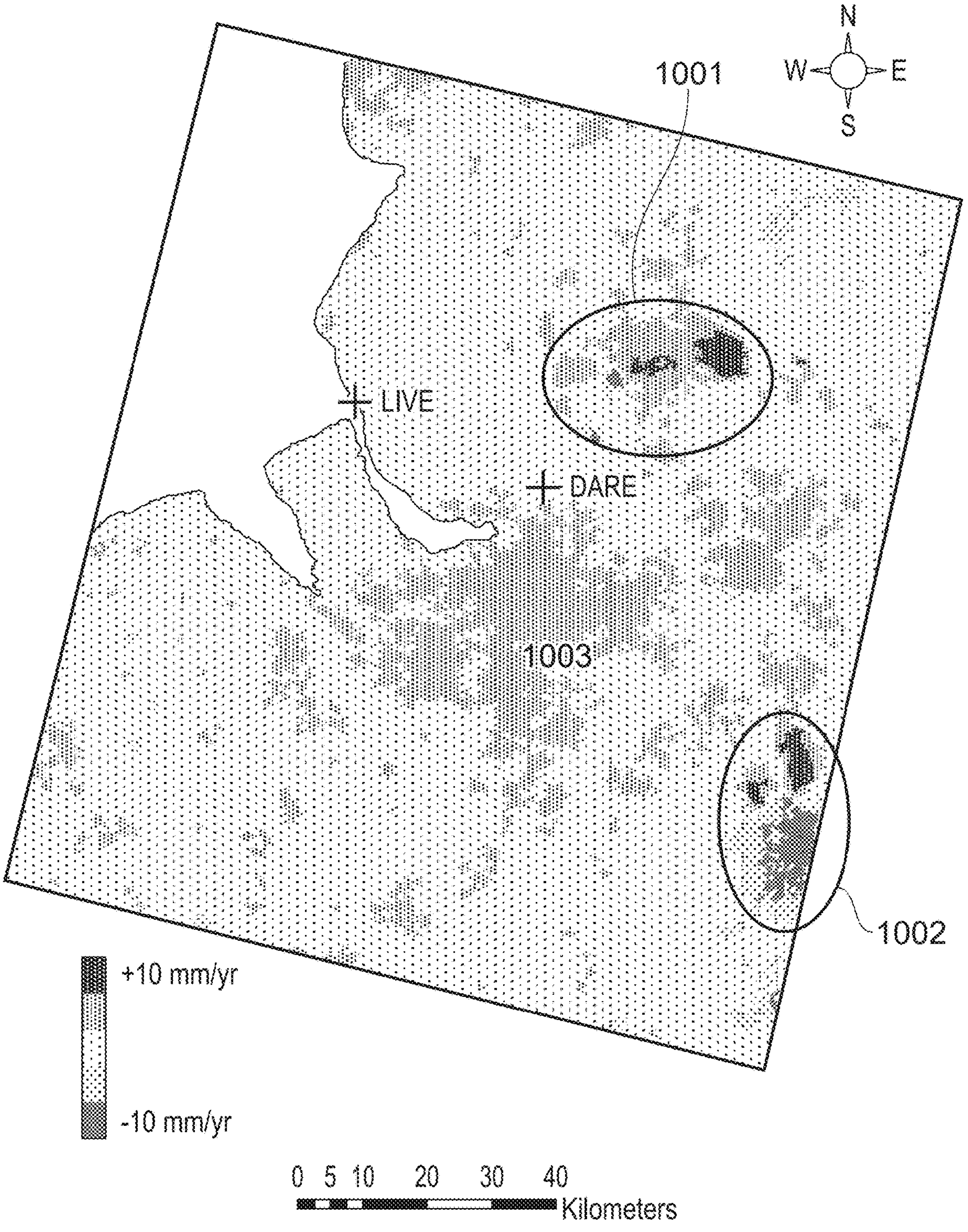

FIGS. 4*a* to 4*d* are schematic diagrams illustrating four different networks of image pairs, each plotting six images in terms of their orbital baseline with respect to image 3 (y axis) against time (x-axis);

FIG. 5 is a schematic flow diagram illustrating an example method;

FIG. 6 is a map of 36 SAR images taken by ERS-1 and ERS-2 satellites, showing location and average amplitude, together with a larger scale map (top left) indicating the location of the images with respect to the United Kingdom;

FIG. 7 is a land cover map of the area imaged in FIG. 6, based on the CLC2000 dataset from the European Environment Agency, showing locations of reference points at the Daresbury (DARE) and Liverpool (LIVE) CGPS stations;

FIG. 8 is a plot of a network of differential interferograms formed between SAR images covering the area shown in FIGS. 6 and 7, each point representing an image plotted according to its perpendicular baseline (y-axis) and temporal baseline (x-axis);

FIGS. 9*a* and 9*b* are maps of the area shown in FIGS. 6 and 7, comparing the result of using different values for the points threshold, or preset minimum number of interferograms;

FIG. 10 is a land deformation map derived from the results of FIG. 9*b;*

Figure 11:
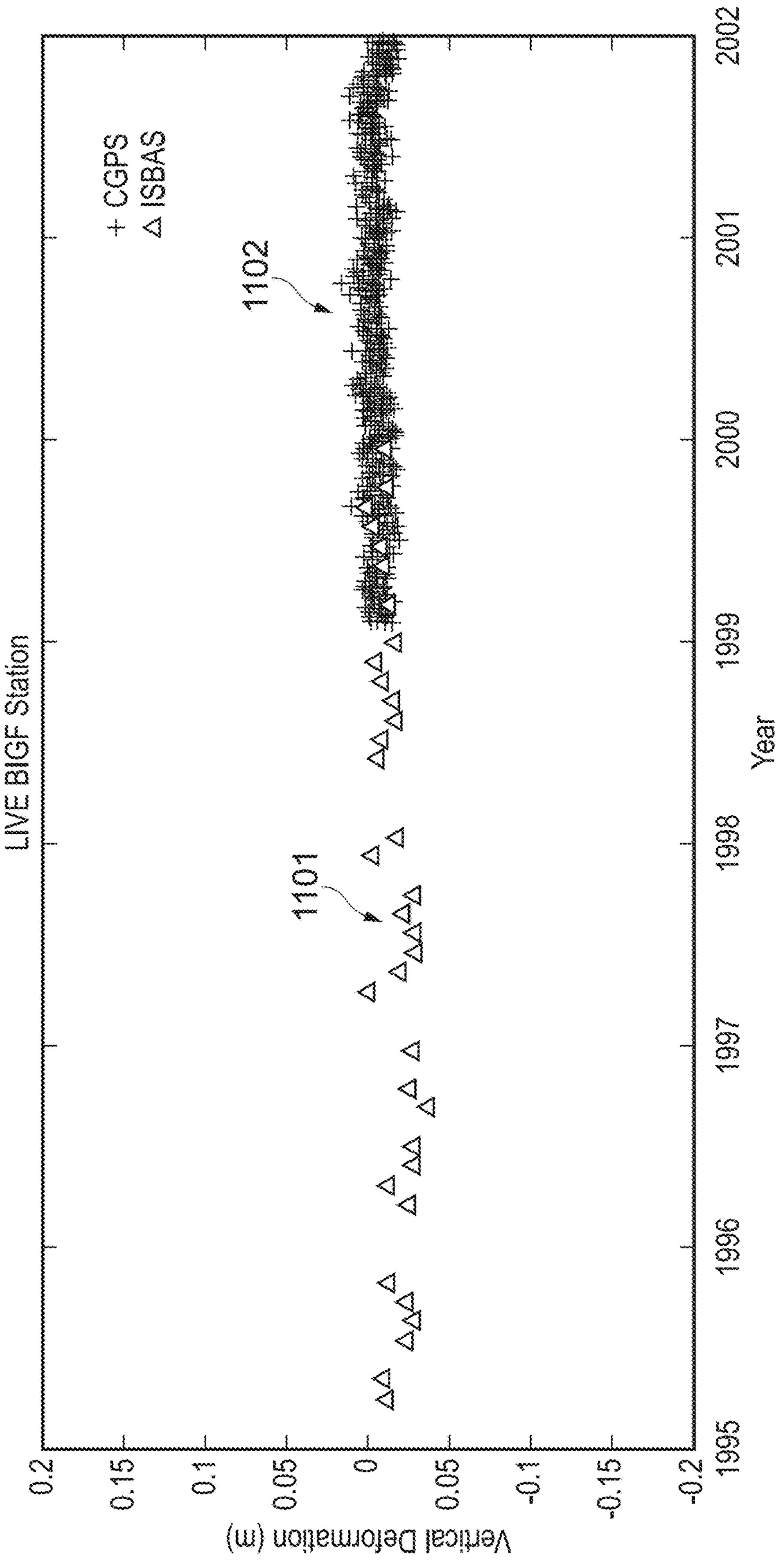
Figure 12A:
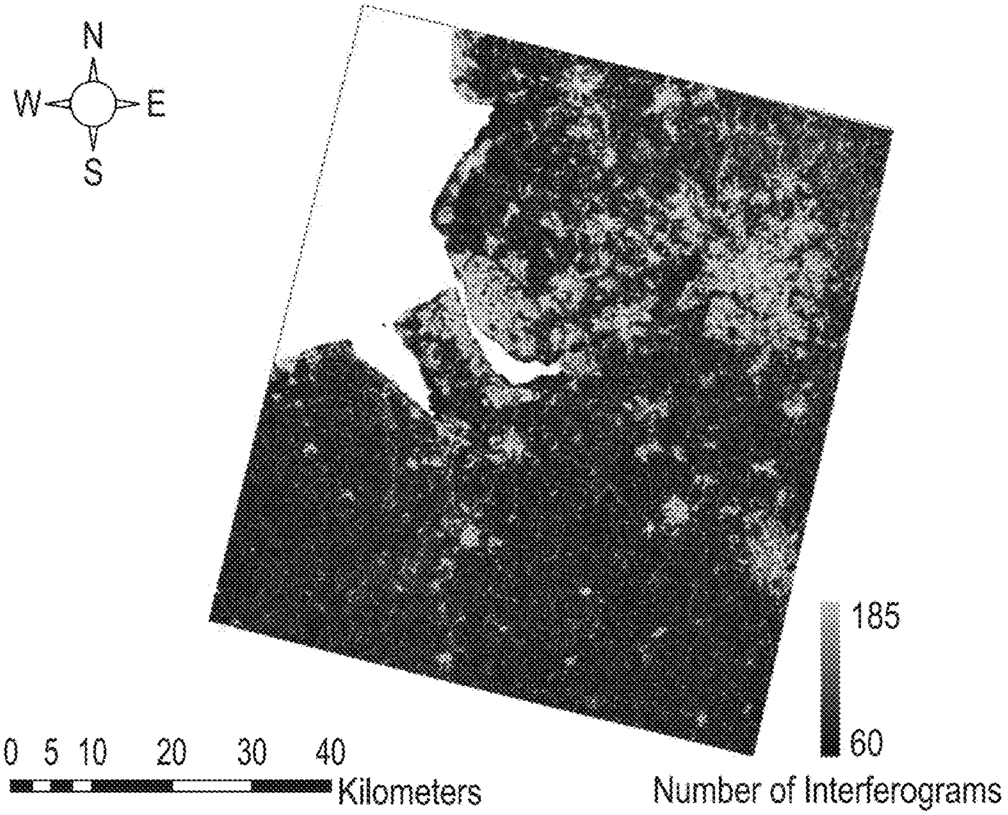
Figure 12B:
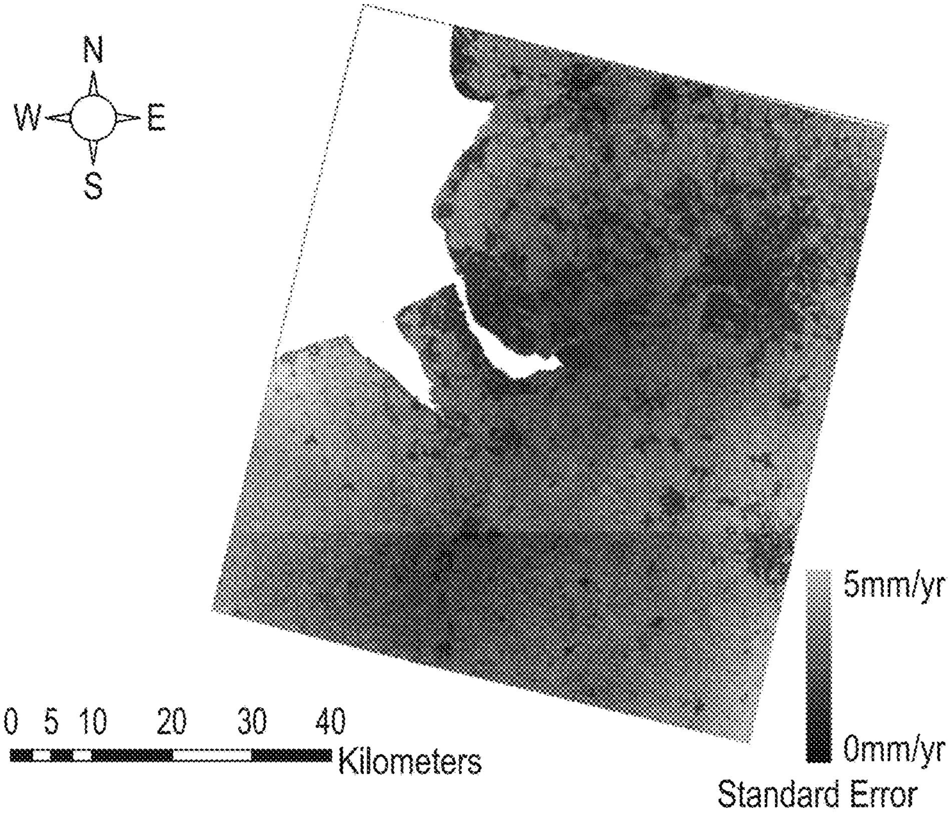
Figure 13A:
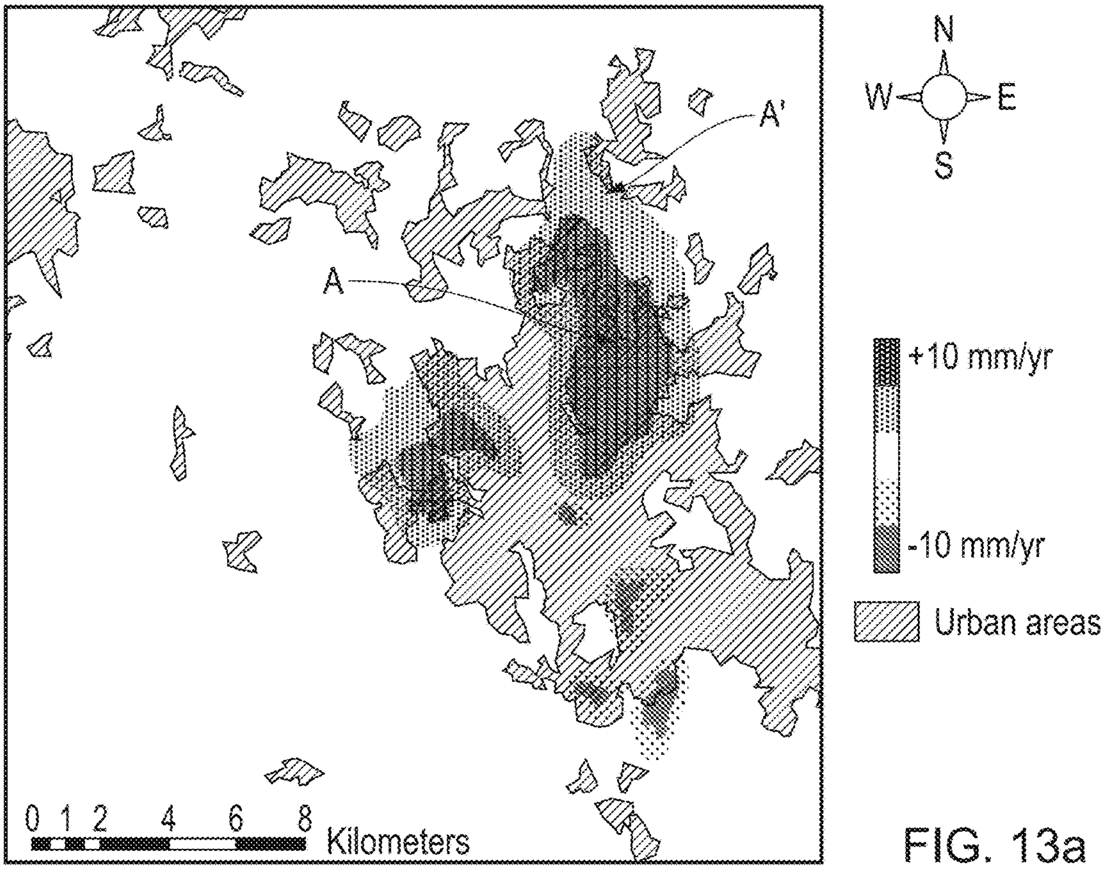
Figure 13B:
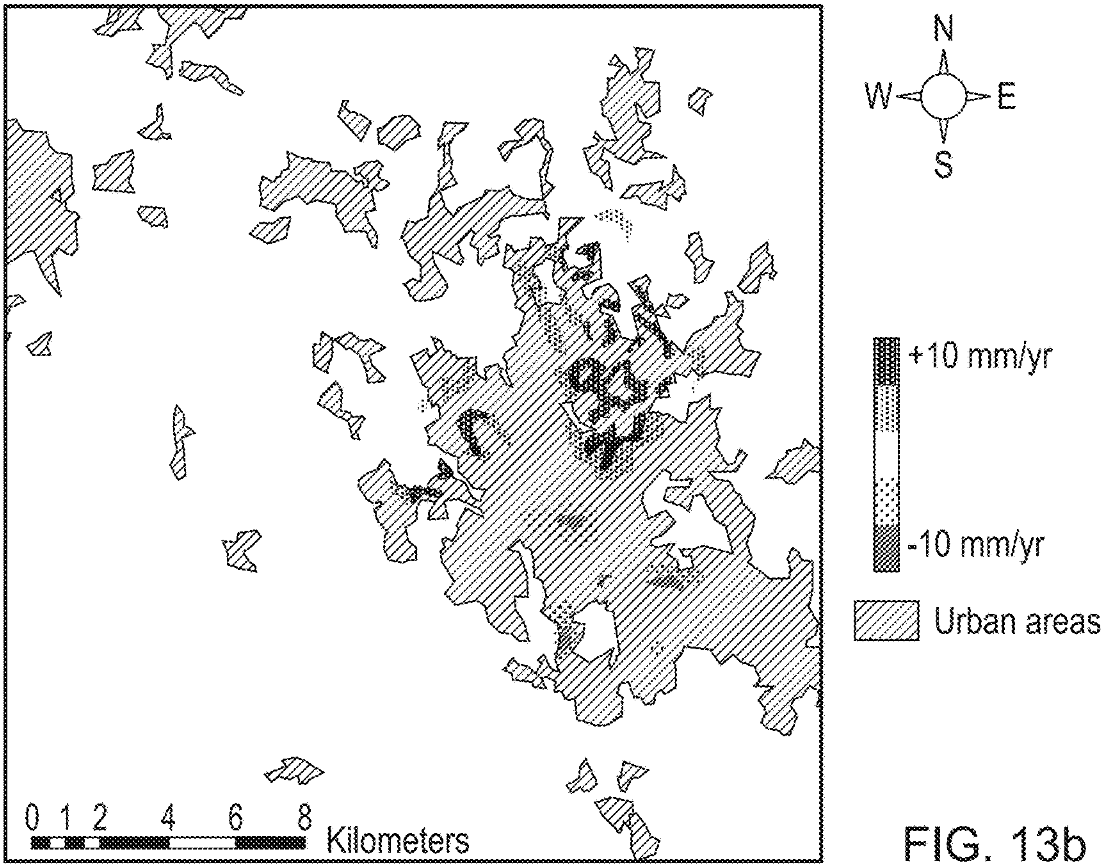

FIG. 11 is a plot of vertical displacement for the LIVE station shown in FIG. 10 as a function of time, along with BIGF CGPS absolute vertical displacement measurements;

FIG. 12*a* is a map showing the number of interferograms used per point in calculating LOS velocity;

FIG. 12*b* is a map showing the standard error of LOS velocities:

FIG. 13*a* is a map showing land deformation from ISBAS analysis around the city of Stoke on Trent;

FIG. 13*b* is a map showing land deformation from conventional SBAS analysis for the same area as in FIG. 12*b;*

Figure 14A:
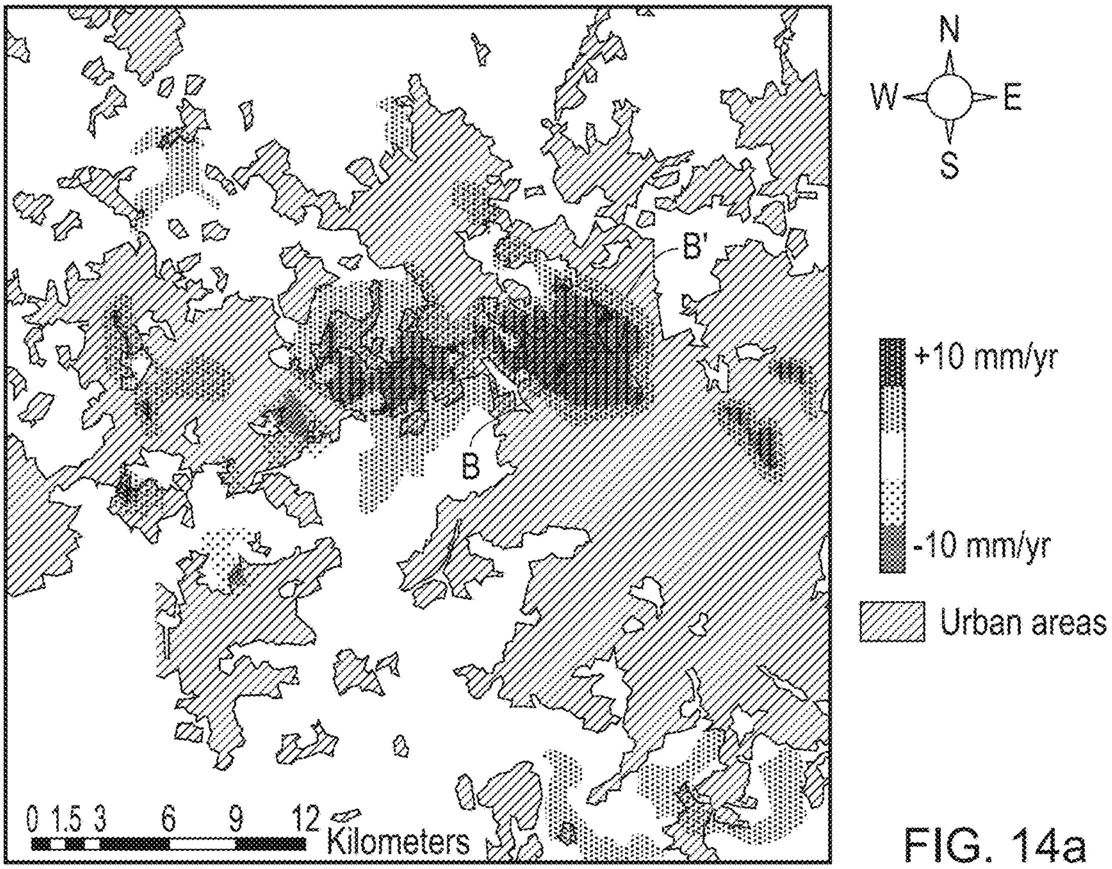
Figure 14B:
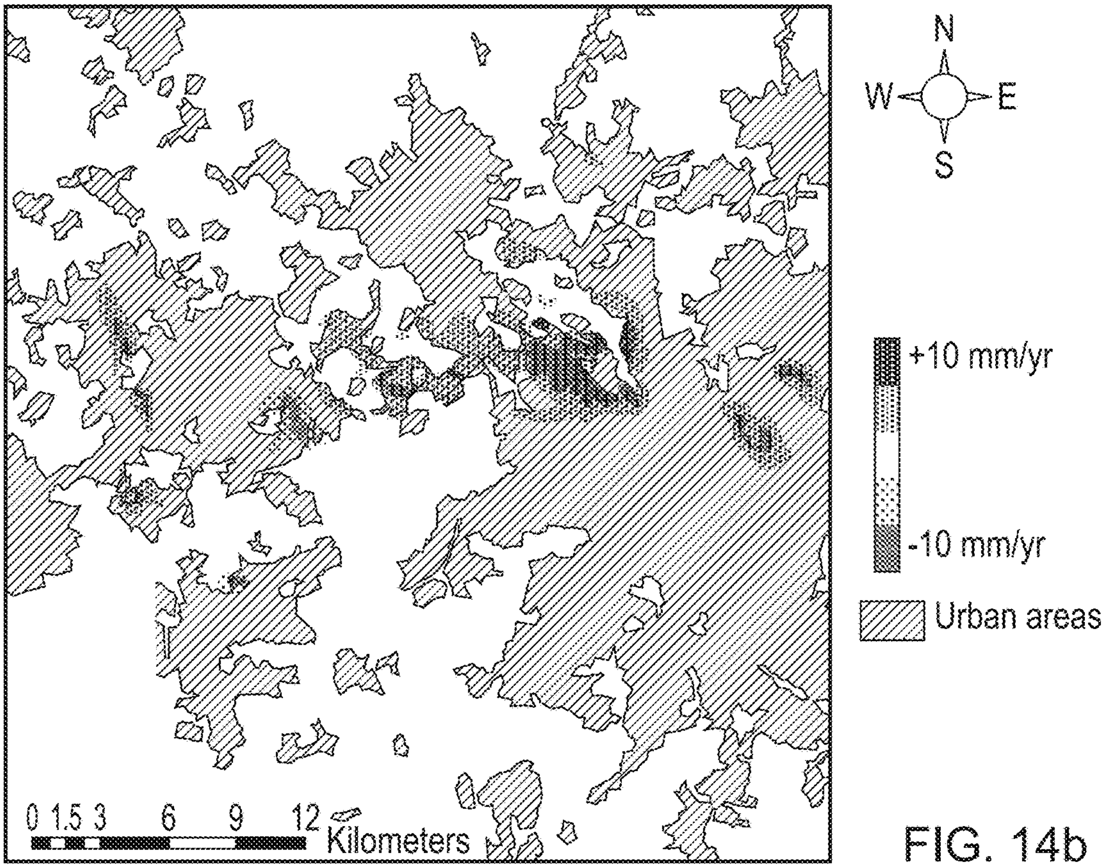

FIG. 14*a* is a map showing land deformation from ISBAS analysis to the west of Manchester;

FIG. 14*b* is a map showing land deformation from conventional SBAS analysis for the same area as in FIG. 14*a*; and FIGS. 15*a* to *d* show LOS time series data for points A (urban) and A' in FIG. 13*a*, and for points B (urban) and B' (rural) in FIG. 14*a*.

The particular type of time-series analysis considered here is the SBAS method first proposed by Berardino et al. [2002]. The SBAS method uses coherence to describe the phase quality of each pixel in each interferogram. Coherence may be defined as the complex correlation coefficient between two sets of pixels that are used to form the phase difference. A measure of coherence may take a value of between 0 (indicating no correlation) and 1 (perfect correlation). In the most general case, resolution cells comprise reflections from a set of elementary scatterers on the ground, each of which may change in the time interval between SAR acquisitions. Any difference between any of the scatterers over time will reduce coherence of the cell and introduce phase noise. The SBAS method ensures that a high phase quality is used for the calculation of cell velocity by using multilooked pixels, which involves taking a spatial average over a defined number of pixels to make a larger multilooked pixel. As an example, consider that we have an image that is 6000×6000 pixels in size with each pixel covering a 10 m×10 m area. If we multilook using a 6×6 kernel, the output multilooked image would be 1000×1000 pixels in dimensions, with each output pixel being 60 m×60 m in size. Each output pixel would be an arithmetic mean of 6×6 complex pixels. Using multilooked pixels helps to reduce the phase dispersion or phase noise in the averaged pixel. This is also helped by only choosing points for which the average multilook coherence over all interferograms is above a certain threshold. These tend to be areas dominated by stable scatterers such as buildings or rocky terrain. The result of this is that areas tending to show less coherence, such as fields and woodland, tend to be excluded from analysis.

The main contributions to phase noise within a pixel are as follows [Zebker & Villasenor, 1992]:

1. Temporal changes to the scatterers, whereby some scatterers are very dynamic and will have changed between SAR acquisitions. This can be due to geometric or hydrological changes and is common for vegetation and areas subject to changing weather such as rainfall and snow. It is, however, important to note that the dynamics of such areas may be intermittently good, meaning that the coherence is actually quite variable over time rather than simply monotonically decreasing over time. Thus, given a number of SAR images, it is difficult to entirely predict which pairs will give high coherence.
2. Spatial changes due to a difference in look angle. As the orbital separation increases, the scattered radar echoes from an area on the ground may combine slightly differently, decreasing coherence. This leads to the concept of the critical baseline where there is a maximum orbital separation for which the phase is pure noise, even for an area consisting only of stable scatterers. In terms of the SBAS method, this effect is low because small orbital baselines are used, albeit primarily to reduce the topographic component of the phase.
3. Volume scattering, where the scatterers are not distributed in a plane but rather in a volume, such as a forest canopy. This reduces the coherence further still due to a greater possibility of interference between scattering components. However, studies of the interferometric coherence of forests have shown great variations in value, depending on forest parameters such as leaves/needles, branches and gaps in the forest canopy, as well as temporal decorrelation [Wegmuller and Werner, 1995; Askne et al., 2003].

Considering the above, it is likely that InSAR observations of all major vegetated land cover classes may exhibit points with intermittent coherence between sets of InSAR pairs gathered over a period of SAR observations. We therefore consider that the SBAS method offers an ideal basis to exploit this property, for two main reasons. Firstly, SBAS is a multiple-master technique that creates many interferograms from only a few images. Thus, it has a greater number of opportunities to spot similarities (high coherence) between image pairs than a single-master method where only a few interferograms are created. Secondly, SBAS involves a coherent pixel, rather than a persistent scatterer, technique and is therefore based upon the coherence measurement rather than any other measure of phase or amplitude dispersion that may not be suitable in non-urban terrain.

Figure 1A:
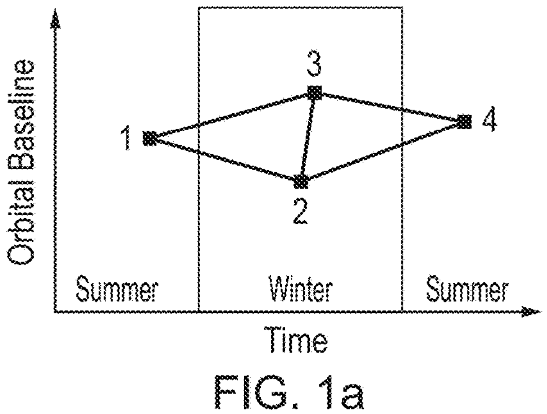
Figure 1B:
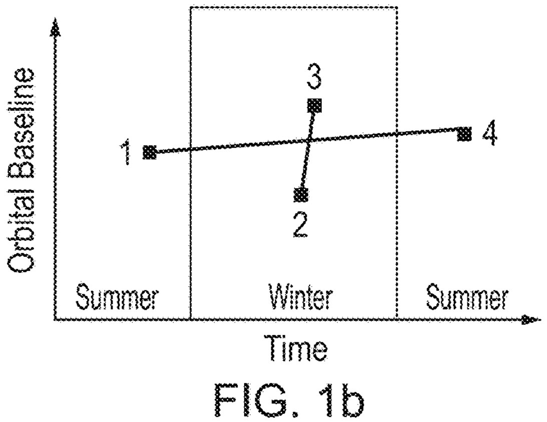

For the method to maximize the occurrence of coherent pairs, it is important to pair all possible images together, bound by any constraint or orbit or temporal separation, so that no possibility is missed in the analysis. A Delaunay triangulation of the SAR acquisitions is commonly applied to an SBAS solution to determine a minimum set of image pairs (see, for example, Pepe and Lanari [2006]), but this may not sufficiently identify all intermittently coherent pairs. To illustrate this, FIGS. 1*a* and 1*b* indicate four images 1-4, identified in terms of their orbital baseline and temporal baseline, arranged in different sets of pairs. If we consider that images 1 and 4 are from the summer, and images 2 and 3 are from the winter period, we might expect that pairs 1-4 and 2-3 would be more coherent than other combinations as the vegetation characteristics are more likely to be similar. A Delaunay triangulation (FIG. 1*a*) would not include the 1-4 pair and the ISBAS algorithm would therefore lose a critical observation of intermittent coherence. Arranging the images as coherent pairs instead (FIG. 1*b*) would include this possible coherence between summer observations. In a general aspect therefore, the plurality of interferograms from pairs of SAR images include one or more pairs of SAR images taken around 12 months apart +/−3 months, or multiples thereof, i.e. images that are more likely to be taken during the same season.

Other types of land cover may be randomly coherent over time but this phase will contain no useful information for the derivation of deformation. Specifically, areas of low reflectivity such as shadow areas and water bodies could randomly give high coherence simply due to uncertainty caused by the low dynamics. In layover areas, the effect is more complex, being the superposition of the response of different slopes [Bamler and Hartl, 1998]. Each of these area types may appear to give good coherence when there is actually very little or no deformation information contained therein. In such circumstances, it is preferable to mask them out prior to analysis, possibly through thresholding the amplitude values or, in terms of layover and shadow, simulation using a digital elevation model (DEM) [e.g., Cigna et al., 2014].

The ISBAS Method

Figure 2:
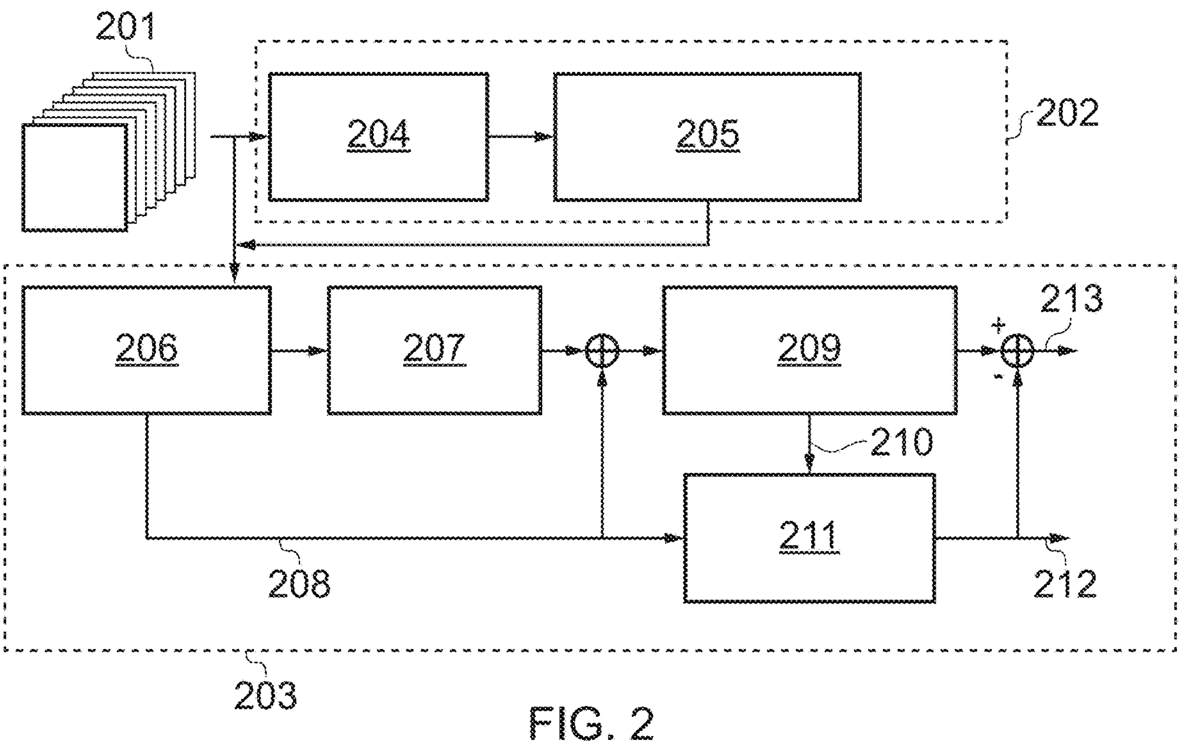
FIG. 2 is a block diagram illustrating an example SBAS algorithm illustrating linear and non-linear algorithm components.

The ISBAS algorithm described here follows the basic low-pass (LP) SBAS method described by Berardino et al. [2002], beginning with a large number of multilooked interferograms formed from a set of SAR observations based upon a condition of small orbital baseline and an appropriate temporal separation. A processing flow diagram for the SBAS algorithm is illustrated in FIG. 2.

The SBAS algorithm is based upon the processing of a stack 201 of differential interferograms that are generated using a two-pass method, in which differential phase is constructed by subtracting a simulated interferogram, generated using a satellite orbit model and a digital elevation model (DEM), from an interferogram that is the phase difference between two SAR images. In this case, the phase value, $\Delta\phi$, of each pixel in a differential interferogram comprises the following components:

$$\Delta\phi=\Delta\phi_{defo}+\Delta\phi_{\delta h}+\Delta\phi_{orb}+\Delta\phi_{atm}+\Delta\phi_{n} \quad (1)$$

where $\Delta\phi_{defo}$ is the phase change due to target motion between the two dates, $\Delta\phi_{\delta h}$ is the phase due to an error $\delta h$ in the DEM used for simulation, $\Delta\phi_{orb}$ is the phase due to an error in the orbit model used for simulation, $\Delta\phi_{atm}$ is the phase component due to differences in atmospheric delay between the two dates and $\Delta\phi_{n}$ is a random noise component.

The basic SBAS algorithm comprises two basic components that are applied in order (see FIG. 2): the 'linear' algorithm 202, for which orbital errors due to $\Delta\phi_{orb}$ are removed and the linear component of $\Delta\phi_{defo}$ and the value of $\Delta\phi_{h}$ are estimated; and the 'non-linear' algorithm 203, for which $\Delta\phi_{atm}$ is estimated and the non-linear components of $\Delta\phi_{defo}$ may be deduced which, when added to the linear component, will give the time sequence of the deformation. The linear algorithm 202 involves the steps of unwrapping the DInSAR interferograms (step 204) and estimating the LP temporal deformation and residual topography (step 205). The non-linear algorithm 203 involves removing the residual topography and LP component (step 206), unwrapping the residual phase component (step 207), combining the output of the residual component unwrapping with the LP temporal deformation component 208 and estimating from this the deformation via the SVD approach (step 209). The LP temporal deformation component 208 and the deformation estimate 210 are input to spatial LP and temporal HP filtering (step 211) and the output provides an atmospheric phase screen 212. This output is combined with the deformation estimate via the SVD approach to provide a time sequence of deformation 213.

The ISBAS algorithm follows the same basic algorithmic steps as the SBAS algorithm in that the basic block diagram is similar to that of FIG. 2. However, a fundamental difference with the ISBAS algorithm lies in how the principle of intermittent coherence is applied to derive the linear and non-linear components. Each of these components is described in turn below.

The 'Linear' ISBAS Algorithm

Consider a simple case where there are ten interferograms in the stack. To decide whether a point is coherent, and will therefore be used in the derivation of land motion, we must look at the ten coherence values associated with the interferograms. For the standard SBAS approach, a decision is made to use a particular point if and only if the average coherence across all ten values is above a specific coherence threshold, R. Any point with an average below this threshold will be rejected.

For illustration, consider the coherence values in table 1 below as an example, using a value of R=0.25 as a coherence threshold. The average coherence of all ten interferograms is 0.22. This is less than R and the point would therefore not be used for SBAS. If the interferogram with the lowest coherence, interferogram 9, is rejected from the calculation and the remaining nine values used, the average increases to 0.24. This is still not greater than R, so the next smallest coherence from interferogram 7 is rejected. The average coherence then increases further to 0.25, which now meets the SBAS criteria for coherence. Thus, this point does not meet the SBAS criteria for coherence using all ten interferograms, but if we use the eight best it does.

In a general aspect therefore, if the average coherence value over all of the interferograms is less than a preset coherence threshold (i.e. R in this example), an adjusted average coherence value is determined that is equal or greater than the preset coherence threshold by excluding one or more of the interferograms in which the pixel has a lower coherence value, provided that the number of remaining interferograms is not less than a preset minimum number of interferograms.

This part of the ISBAS method may be carried out iteratively, i.e. by repeating the step of determining an average coherence value after excluding the interferogram in which the pixel has the lowest coherence value until the average coherence value is above the preset coherence threshold or until the number of remaining interferograms is less than a preset minimum number of interferograms.

It is important that a preset minimum number of interferograms is defined, because this ensures pixels having too little coherence, the apparent coherence of which may for example be more due to random variation, do not contribute to the overall result.

TABLE 1

The effect of rejecting interferograms with low coherence to increase the average coherence.

| Interferogram | Coherence | Coherence (reject lowest value) | Coherence (reject two lowest values |
|---|---|---|---|
| 1 | 0.18 | 0.18 | 0.18 |
| 2 | 0.29 | 0.29 | 0.29 |
| 3 | 0.28 | 0.28 | 0.28 |
| 4 | 0.20 | 0.20 | 0.20 |
| 5 | 0.33 | 0.33 | 0.33 |
| 6 | 0.26 | 0.26 | 0.26 |
| 7 | 0.13 | 0.13 | |
| 8 | 0.27 | 0.27 | 0.27 |
| 9 | 0.03 | | |
| 10 | 0.19 | 0.19 | 0.19 |
| Average | 0.22 | 0.24 | 0.25 |

Note that the point would not be considered for an SBAS analysis because the average coherence over all interferograms is less than 0.25, but it would be considered for an ISBAS analysis based on the average of at least eight coherences being over the threshold.

Consider that we have i multilooked pixels in each interferogram and, following the point-by-point analysis above, the maximum number of interferograms that meet the criteria has been calculated for each point as $n_i$ (i.e. the average coherence of the $n_i$ best interferograms is greater than R). For ISBAS, a point is defined as coherent if and only if $n_i \geq N$, where N is some threshold minimum number of interferograms determined by the operator. If this criterion is met, the target velocity will be determined for this point, but only using the phase values from those $n_i$ interferograms. The lower coherence values will not be used. The value of $n_i$ is likely to vary from point-to-point.

Setting $n_i \geq N$ sets a maximum threshold for the standard error of the ISBAS point velocity estimate, because this is inversely proportional to the square root of $n_i$, the number of observations. Thus, if there are n interferograms in total, the ratio between the smallest and greatest standard error will be around $\sqrt{(N/n)}$ across the image. If the point threshold N is low, it is likely that a lot of points in the image will be identified as coherent. If N is high, the number of coherent points will decrease, tending towards the SBAS solution. Conversely, if N is low, the standard error is likely to be high. Usually, the choice of N depends on balancing point coverage against standard error but it is clear that a greater confidence in the outcome will be achieved if there are a large number of interferograms to begin with.

Once the minimum number of interferograms, N, has been decided upon and coherent points have been identified, the phase in each interferogram must be unwrapped. The ISBAS algorithm takes the following approach to phase unwrapping. Firstly, only the sparse network of coherent point locations is considered for unwrapping in each interferogram. Secondly, in any one interferogram, a coherent point location is not considered for unwrapping if that interferogram was rejected when calculating average coherence. This can reduce the sparse network further.

Figure 3:
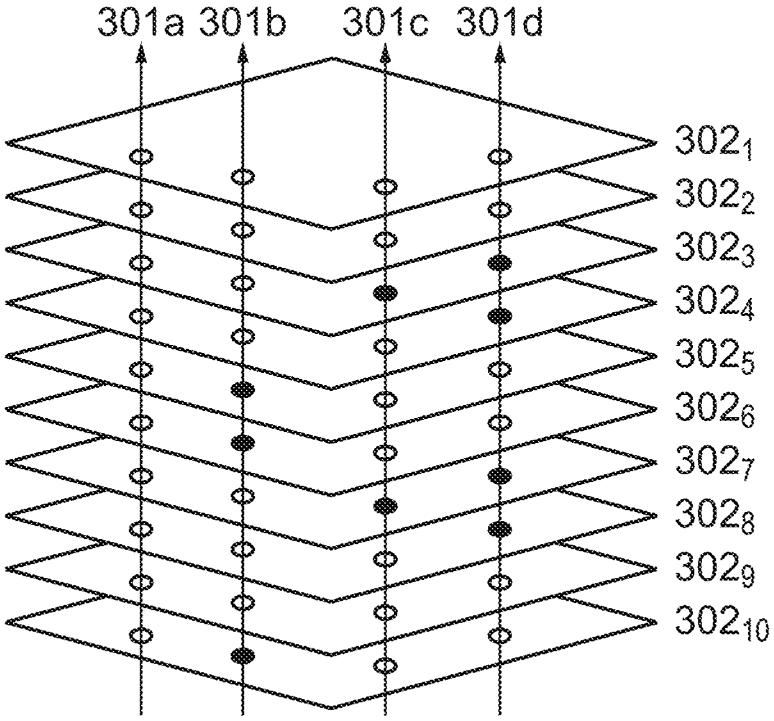
FIG. 3 is a schematic diagram illustrating a series of interferograms with points for phase unwrapping that are identified based on coherence.

FIG. 3 shows four coherent points 301*a-d* and their coherence in each of ten interferograms $\mathbf{302}_{1\text{-}10}$. The black and white points represent the phase values of coherent points in each interferogram. The black points represent phase values of points of poor coherence that were rejected, whereas the white points represent pixels having a sufficiently high average coherence that will be used for the time series analysis. For the ISBAS analysis, the black points are not unwrapped when phase unwrapping an interferogram. Thus, from the example shown in FIG. 3, for interferograms 1 and 2, points a to d are unwrapped; for interferogram 3, points a and b are unwrapped; for interferogram 4, points a, b and c are unwrapped, for interferograms 5 and 6, points a, c and d are unwrapped; for interferogram 7, points a and b are unwrapped; for interferogram 8, points a, b and c are unwrapped; for interferogram 9, points a to d are unwrapped; and for interferogram 10, points a, c and d are unwrapped.

For the SBAS approach, it is important that all interferograms are unwrapped with respect to the same stable reference point, which is a pixel whose phase value will be unchanged by the unwrapping process. The ISBAS process has the same requirement and it is important to choose a stable point that occurs in every interferogram. Therefore a point with good coherence in all interferograms (which therefore would be accepted as a coherent point by an SBAS analysis) should be used. In other words, the step of deriving a measure of vertical movement (example details of which are provided below) from the measure of phase difference for each pixel comprises extracting phase information with respect to a common pixel in the plurality of interferograms for which the average coherence value over all of the interferograms is equal to or above the preset coherence threshold.

Once unwrapped, any phase ramp in each interferogram, which may be assumed due to errors in the orbit model ($\Delta\phi_{orb}$), is removed. The following equation is then solved to estimate the linear velocity $V_{ij}$ and height error $\delta h_{ij}$:

$$\Phi_{ijk} = \frac{4\pi}{\lambda}\left(\delta t_k V_{ij} + \frac{B_{\perp}^{ijk}}{R_{ij}\sin\theta_{ij}}\delta h_{ij}\right) \tag{2}$$

where (i,j) are the row and column coordinates of the point in the multilooked master image, k is the index of the interferogram, $\Phi_{ijk}$ is the unwrapped interferogram phase, $\lambda$ is the radar wavelength, $\delta_{tk}$ is the time difference between the two images forming the $k^{th}$ interferogram, $B\_^{ijk}$ is the perpendicular baseline of the point in the $k^{th}$ interferogram, $R_{ij}$ is the slant-range to the target and $\theta_{ij}$ is the incidence angle of the radar with the gravity normal. It is important to state here that, because the LP SBAS method is used, linear velocity and height error may be solved simultaneously for each point using equation 1 using an appropriate method such as least squares.

The 'Non-Linear' ISBAS Algorithm

The result of the previous 'linear' algorithm is the estimation of the linear deformation, height error, and orbital error components of the differential phase of each coherent point. From equation 1 above, we see that if we remove these components and can also estimate the atmospheric delay component, the non-linear components of deformation will be the only parts that remain. Thus, the primary goal of the 'non-linear' part of the algorithm is to estimate atmospheric delay.

The 'non-linear' SBAS algorithm has the following four components:

1. Remove the components of the phase identified by the 'linear' algorithm from the original phase value to leave the residual phase;
2. Unwrap the residual phase;
3. Combine the unwrapped residual phase differences with the linear velocity estimate and perform a linear adjustment to derive a phase for each SAR image; and
4. Estimate the atmospheric delay component through a cascade of a high-pass filter in time and a low-pass spatial filter.

For the ISBAS algorithm, these steps are essentially the same with the following modifications:

- Unwrapping the residual phase is performed, as with the 'linear' algorithm, on 'good' pixels only, i.e. those pixels from interferograms that have not been excluded as part of the step of determining an adjusted average coherence value for a pixel;
- Linear adjustment of the unwrapped phase residuals must also take into account only the 'good' pixels.

Regarding the latter, consider that we have a number of SAR images and have formed differential interferograms between them. The interferograms form a system of equations, represented in matrix form by:

$$A\phi = \Delta\phi \tag{3}$$

where A is the observation matrix, $\Delta\phi$ is a vector of the differential phases and $\phi$ is the vector of unknowns, namely the phases of each image. As the equations represent difference in phase, it is not possible to derive absolute phase so, without loss of generality, the phases are derived relative to one of the images, for example the first image.

To reduce the presence of large discontinuities in the result, we follow Berardino et al. [2002] in reconstructing equation 3 as:

$$Bv = \Delta\phi \tag{4}$$

where v is the vector of the unknown phase velocity between time-adjacent images and B is the corresponding observation matrix. This equation may then be solved using single value decomposition (SVD) to give a minimum-norm least squares solution for the vector v. The phase for each image may then be derived through integration.

For the ISBAS algorithm, some points in an interferogram stack will have used all interferograms in the calculation of linear phase, as illustrated by point 301*a* in FIG. 3. However, as can be seen from the same figure, some points will have rejected some interferograms due to low coherence. Therefore the interferogram network and the observation equation given in equation 4 is likely to be different for every single point.

Figure 4:
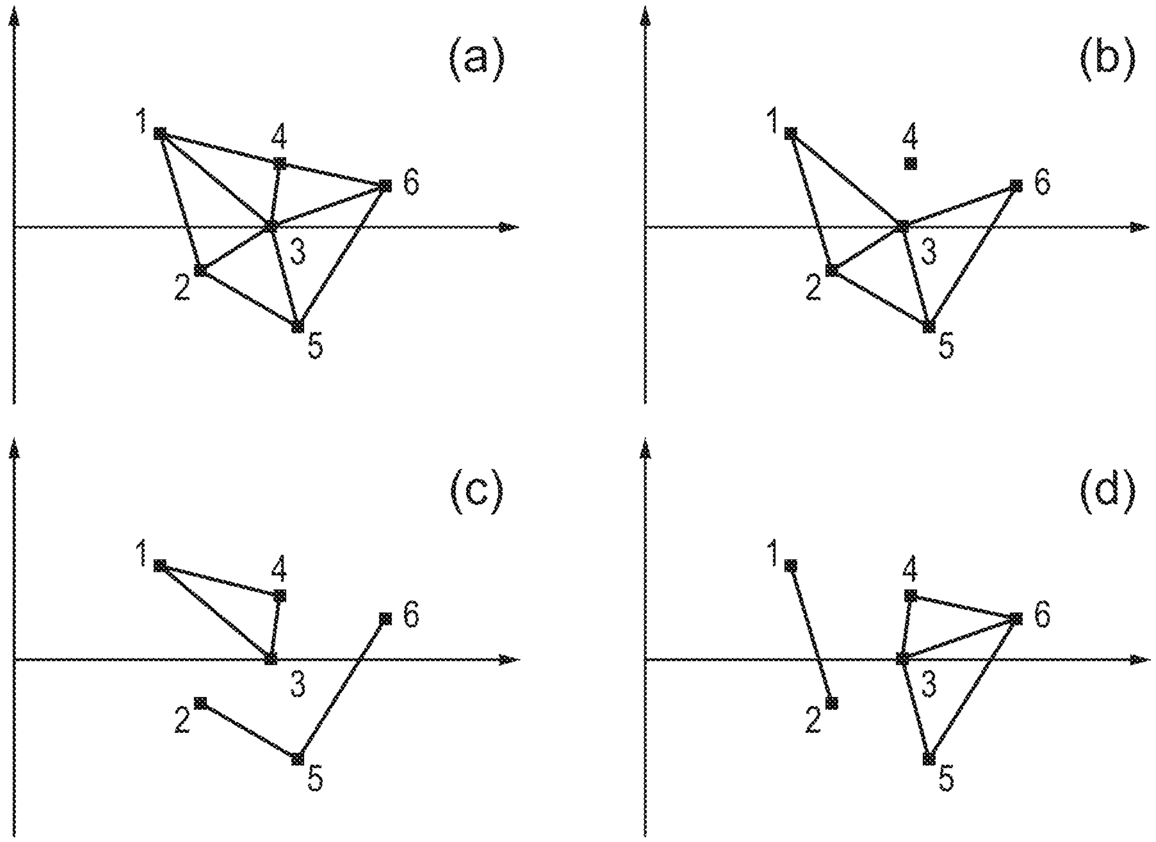

Assuming that we have a network of image pairs, we must also consider whether it will support the derivation of a time series. In FIG. 4, four example networks between six images are illustrated. FIG. 4*a* represents a network for a point that has good connectivity, which would be an ideal case where a possible time series may be derived for all six images. FIG. 4*b* represents a case where one image (image 4) is not connected to the network. FIG. 4*c* shows a network divided into two patches that overlap in time. FIG. 4*d* shows a case where the two networks do not overlap in time.

The case illustrated in FIG. 4*b* shows that three of the ten interferograms (between pairs 3-4, 4-6 and 1-4) have been rejected due to low coherence, leaving no connectivity between the network and image 4. This is a common occurrence when some localized change has happened in a single image, which may be due to an event such as flooding or precipitation that does not appear in any other image, resulting in poor coherence. For this network, the ISBAS approach is to attempt a time series solution that includes the five remaining images only, thereby excluding image 4 completely from the analysis.

FIGS. 4*c* and 4*d* represent the cases when the network is comprised of two separate networks, or 'patches'. In FIG. 4*c* the patches overlap in time whereas in 4*d* they do not. Of these two cases, reconstructing the observation equation as in equation 4 means a solution may exist for 4*c* and therefore solutions for all connected images may be possible, whereas in 4*d* there can be no solution because there is no overlap [Lauknes et al., 2011].

In all of these cases, it is possible to test the network and the redundancy of each point in turn to see if there is a solution for all or some of the image dates. If there is a solution, the rank of the observation matrix should be greater than one less than the number of images to be solved for. This will test against redundancy and whether patches overlap. In the case where a non-linear solution is not possible, only a linear solution is output by the ISBAS algorithm.

In order to help mitigate against problems with network redundancy and overlap, it is important to begin with a wide and dense network of interferograms to start with such that the exclusion of a few interferograms will have very little impact on the solution, in terms of the rank of the observation matrix or the number of images not included in the solution. Thus, it is clear that the ISBAS algorithm will be optimized when a large amount of images, regularly spaced in time, are utilized.

Once the inversion process is complete and a residual phase per SAR image is available, it is possible to proceed with the cascade filter to derive atmospheric delay for each interferogram. As mentioned above, individual points are likely not to have a phase in every SAR image so the filter is only applied to those phase values available, in time and space.

After the atmospheric delay has been derived, the residual non-linear components may be identified and combined with the linear components to form a full deformation profile for every point.

FIG. 5 is a schematic flow chart illustrating an example method. At step 501 a plurality of synthetic aperture radar images covering an area of interest at different points in time is acquired. These images may be previously obtained from satellite measurements, or alternatively from airborne measurements, and acquired from a database. At step 502, a plurality of interferograms is derived from pairs of the synthetic aperture radar images, each interferogram comprising a measure of phase difference between pixels (commonly groups of pixels) of a respective pair of synthetic aperture radar images. As explained above, not every possible pair from the plurality of images needs to be generated, but pairs that are more likely to exhibit higher coherence should be selected, such as pairs of images taken at a similar time of year, for example at times separated by 12 months plus or minus 3 months, or multiples thereof.

At step 503, a first (or next) pixel from the plurality of interferograms is selected. At step 504, an average coherence value is determined for the corresponding pixel over all of the interferograms (or over all the remaining interferograms, if the step is being repeated). A comparison is then made, at step 505, between the average coherence value and a preset coherence threshold. If the average coherence value is equal to or greater than the preset coherence threshold, the pixel is marked as a 'good' pixel that can be used for phase unwrapping (step 506). If there are any remaining pixels (step 507), step 503 onwards is repeated for the next pixel. If, at step 505, the average coherence value is lower than the preset coherence threshold, and the number of (remaining) interferograms is greater than the minimum number (step 508), the pixel in the plurality of interferograms having the lowest coherence value is excluded (step 509), and step 504 is repeated, determining an adjusted average value with the lowest coherence value excluded. If, at step 508, the number of remaining interferograms is not greater than the minimum number, the pixel is marked as 'bad' (step 510) and is marked as not for use. If there are any remaining pixels (step 507), the process continues from step 503 with the next pixel.

Once all pixels are analysed, the process continues, at step 511, with unwrapping the phase information for all of the 'good' pixels, i.e. excluding those for which an average coherence value equal or greater than the threshold could not be determined. Land deformation information is derived from the unwrapped phase information (step 512), and a map is output (step 513).

EXAMPLES

To demonstrate the ISBAS algorithm, 36 descending images from the European Remote-Sensing satellites ERS-1 and ERS-2 have been used. The images are of the area around the cities of Manchester and Stoke on Trent in the UK, which are sites of known land deformation primarily due to historical coal mining [Donnelly, 2006]. Table 2 below is a list of the data used and their perpendicular baselines, relative to the image gathered on 22 Jul. 1997, used as reference arbitrarily on the basis that it is in the middle of the acquisitions, thereby minimizing any temporal changes between it and the 35 slave images that could affect image coregistration.

TABLE 2

A list of the 36 ERS-1/-2 SAR images from track 409 and frame 2530. The perpendicular baseline shown is relative to the image acquired on 22$^{nd}$ Jul. 1997, which was used as reference for the coregistration.

| id | satellite | orbit | date | perpendicular baseline (m) |
|---|---|---|---|---|
| 1 | ERS-1 | 19435 | 1995 Apr. 3 | −507 |
| 2 | ERS-1 | 19936 | 1995 May 8 | −777 |
| 3 | ERS-1 | 20938 | 1995 Jul. 17 | −57 |
| 4 | ERS-2 | 1766 | 1995 Aug. 22 | −11 |
| 5 | ERS-2 | 2267 | 1995 Sep. 26 | 164 |
| 6 | ERS-1 | 22441 | 1995 Oct. 30 | 704 |
| 7 | ERS-1 | 24445 | 1996 Mar. 18 | 286 |
| 8 | ERS-2 | 5273 | 1996 Apr. 23 | 429 |

TABLE 2-continued

A list of the 36 ERS-1/-2 SAR images from track 409 and frame 2530. The perpendicular baseline shown is relative to the image acquired on 22nd Jul. 1997, which was used as reference for the coregistration.

| id | satellite | orbit | date | perpendicular baseline (m) |
|---|---|---|---|---|
| 9 | ERS-2 | 5774 | 1996 May 28 | −247 |
| 10 | ERS-2 | 6275 | 1996 Jul. 2 | 168 |
| 11 | ERS-2 | 7277 | 1996 Sep. 10 | −305 |
| 12 | ERS-2 | 7778 | 1996 Oct. 15 | 139 |
| 13 | ERS-2 | 8279 | 1996 Nov. 19 | 1017 |
| 14 | ERS-2 | 8780 | 1996 Dec. 24 | −304 |
| 15 | ERS-2 | 10283 | 1997 Apr. 8 | 485 |
| 16 | ERS-2 | 10784 | 1997 May 13 | −88 |
| 17 | ERS-2 | 11285 | 1997 Jun. 17 | −152 |
| 18 | ERS-2 | 11786 | 1997 Jul. 22 | 0 |
| 19 | ERS-2 | 12287 | 1997 Aug. 26 | 371 |
| 20 | ERS-2 | 12788 | 1997 Sep. 30 | −73 |
| 21 | ERS-2 | 13790 | 1997 Dec. 9 | 808 |
| 22 | ERS-2 | 14291 | 1998 Jan. 13 | −212 |
| 23 | ERS-2 | 16295 | 1998 Jun. 2 | 414 |
| 24 | ERS-2 | 16796 | 1998 Jul. 7 | 586 |
| 25 | ERS-2 | 17297 | 1998 Aug. 11 | −77 |
| 26 | ERS-2 | 17798 | 1998 Sep. 15 | −341 |
| 27 | ERS-2 | 18299 | 1998 Oct. 20 | −438 |
| 28 | ERS-2 | 18800 | 1998 Nov. 24 | −664 |
| 29 | ERS-2 | 19301 | 1998 Dec. 29 | −527 |
| 30 | ERS-2 | 20303 | 1999 Mar. 9 | −439 |
| 31 | ERS-2 | 21305 | 1999 May 18 | 135 |
| 32 | ERS-2 | 21806 | 1999 Jun. 22 | 152 |
| 33 | ERS-2 | 22307 | 1999 Jul. 27 | 453 |
| 34 | ERS-2 | 22808 | 1999 Aug. 31 | −647 |
| 35 | ERS-2 | 23309 | 1999 Oct. 5 | −141 |
| 36 | ERS-2 | 24311 | 1999 Dec. 14 | 143 |

The average amplitude of the 36 SAR images is shown in FIG. 6. The location of the urban centre of Manchester in the upper right of the image and Stoke on Trent in the lower middle right. The area is relatively flat, dominated by the Cheshire Basin that runs south from Manchester towards the bottom of the image, to the west of Stoke on Trent. However, there is some moderate terrain in the top right (Pennine Mountains) and bottom left (Cambrian Mountains). The distribution of the 5 land cover classes of the first level classification of the CORINE Land Cover map 2000 (CLC2000) is shown in FIG. 7, covering agricultural areas 701, urban areas 702, forest and semi-natural areas 703, water bodies 704 (which are excluded from analysis) and wetlands 705. It can be seen that, outside the urban areas, the area is largely dominated by agriculture, forestry and wetland areas.

Two-pass differential interferograms were formed between image pairs with a perpendicular baseline less than or equal to 250 m and a temporal baseline less than or equal to 4 years and using a DEM from the SRTM campaign [Janis et al., 2008]. The network of the resulting 185 pairs is shown in FIG. 8. Each black square represents one of the 36 ERS SAR images, and the lines linking pairs of images together show that a difference interferogram has been created between them. Note that the image 801 from 19 Nov. 1996 does not make any small baseline pair with any other image, meaning that the analysis was performed using 35 of the 36 images.

The value of the coherence threshold used for the analysis was 0.25, in accordance with Berardino et al. [2002]. The value of the points threshold, N, to be applied to the data using the ISBAS algorithm required some consideration. A value of N=185 represented those points having an average coherence across all interferograms of at least 0.25, which is equivalent to an SBAS solution. This case is illustrated in FIG. 9*a*, where approximately 8% of the possible land area is covered. When compared with the land cover map of FIG. 7, the point coverage almost perfectly matches the urban classes in the area, which is what we would expect from an SBAS algorithm. However, the incomplete coverage that this implies would certainly deter the application of an SBAS or PSInSAR algorithm across the full image area, not least due to the uncertainty of phase unwrapping across the sparsely covered rural areas. If a value of N=60 is used instead, the map in FIG. 9*b* results, representing all points that have an average coherence of 0.25 across at least 60 interferograms, the number of points increases and now 86% of the possible land area is covered with very few obvious gaps. It should be noted that this increase has occurred over all land cover types.

The point density when N=60 for each major land cover class is shown in table 3 below and compared to the density of SBAS points. The highest density of points is found in the Urban Areas class which also provides good responses in an SBAS analysis. However, excellent point densities are also found in the other main classes, especially the Forests and Semi-Natural Areas class.

TABLE 3

SBAS and ISBAS point density for each major land cover class of the CLC2000 dataset.

| CLC2000 Land Cover Class (level 1) | SBAS points per Square Kilometer | ISBAS points per Square Kilometer |
|---|---|---|
| Agricultural Areas | 5 | 118 |
| Urban Areas | 60 | 144 |
| Forest and Semi-Natural Areas | 3 | 134 |
| Wetlands | 2 | 61 |

In terms of the 'linear' algorithm, a value of N=60 is likely to increase the standard error of any velocity estimate, simply because of the reduction in observations, by a ratio of approximately √185/60=176% in the worst case, when compared to the SBAS case. However, with 185 interferograms, the standard error is very low—generally less than 1 mm/year. Using N=60 would therefore seem an acceptable risk given the improvement in point coverage over the site. The value for N will, as mentioned above, tend to vary depending on the available data, but will typically be at least 50 and preferably at least 60.

The resulting linear velocities for the ISBAS analysis are shown in FIG. 10. Each point measurement has a resolution of approximately 100 m×100 m. Phase unwrapping of the coherent points in each interferogram was performed using the SNAPHU software [Chen and Zebker, 2002]. The reference point chosen coincides with the location of a continuously-operating GPS station, DARE, from the British Isles GNSS Facility (BIGF) [BIGF, 2014] at Daresbury. Although the station was not operating until April 2000, it indicated a potentially stable location. The mean ISBAS velocity over the whole scene is −1.3 mm $yr^{-1}$ with some significant areas of deformation around the cities of Stoke on Trent and Manchester, identified by ellipses 901 and 902 respectively. Both of these cities are some 40 km apart with the primarily non-urban classes of the Cheshire Basin 903 dominating the region between them.

The resulting ISBAS linear velocities range between −13.4 mm $yr^{-1}$ and +18.2 mm $yr^{-1}$, with the highest deformation rates observed around Manchester In addition to the reference point DARE, the site contains another BIGF station, identified as LIVE, which is a stable site with a GPS observation period (February 1999-August 2011) that overlaps with the period of the ISBAS analysis by almost a year. The BIGF and ISBAS velocities for each of the points DARE and LIVE are shown in table 4 below. The equivalent vertical velocity is derived from a simple projection of the LOS velocity into the vertical direction, equivalent to multiplying the LOS velocity by a factor of 1.09 for a 23 degree incidence angle. Although the periods of observation are different, especially for DARE, there is only around 0.4 mm $yr^{-1}$ difference in the velocities. Given other studies, such as the Terrafirma validation project [Crossetto et al., 2008], which found InSAR estimates of velocity having an RMSE of around 1-2 mm yr-1, we may conclude that the GPS and ISBAS measurements are in agreement.

TABLE 4

Comparison of GPS-derived and ISBAS-derived velocities. The DARE station was used as the reference point for the ISBAS analysis.

| Station | DARE | LIVE |
|---|---|---|
| Vertical Velocity (GPS) | 0.1 ± 0.2 mm $yr^{-1}$ | −0.5 ± 0.2 mm $yr^{-1}$ |
| Equivalent Vertical Velocity (ISBAS) | 0.3 ± 0.8 mm $yr^{-1}$ | −0.9 ± 1.3 mm $yr^{-1}$ |

The ISBAS time-series results 1101, converted to equivalent vertical displacement, for the LIVE station is shown in FIG. 11, along with the BIGF CGPS absolute vertical displacement measurements 1102. Although the two series only overlap by a period of one year, they appear to be in approximate agreement with a mean difference between the GPS measurements and the seven ISBAS equivalent vertical displacements of 0.9 mm during the overlap period with a standard deviation of 5.8 mm and a range of 0.2 to 14 mm. However, the GPS data provided here, unlike the ISBAS measurements, are absolute, not relative so it may be expected that the spread of errors would be reduced in reality.

The number of interferograms used in the calculation of LOS velocity for each point is shown in the map of FIG. 12*a*, and runs from 60 (the point threshold) to 185 (the maximum number of interferograms). Urban areas use the largest number of interferograms, since they have the most stable coherence. These areas also have the smallest standard error, which is shown in the map of FIG. 12*b*, which is again to be expected given the higher number of observations.

The ISBAS results around Stoke on Trent are detailed in FIG. 13*a*, in comparison with standard SBAS results in FIG. 13*b*, where the urban regions have been highlighted as hatched areas, based on the CLC2000 dataset. The urban areas are more densely covered in points and less noisy than the non-urban areas, which in this case are primarily agricultural or forested. Points in the non-urban areas are more likely to have a larger standard error simply due to the reduced number of interferograms used to derive the velocity. In the urban areas, the ISBAS observations of uplift and subsidence, both related to coal mining, agree well with a previous survey performed using a standard persistent scatterers InSAR (PSInSAR) [Culshaw et al, 2006], although a different SAR data set and a reference point in the town of Leek, outside of the extent of our data, were used. The areas of deformation identified by ISBAS also appear to extend into the non-urban area, illustrating a capability to map the complete deforming region.

An equivalent comparison is shown in FIGS. 14*a* and 14*b*, showing an area to the west of Manchester. This area contains a higher density of urban classes than Stoke on Trent and, again, urban classes appear less noisy than the non-urban regions. Some of the deforming areas extend into both urban and non-urban classes which give a more complete view of the land motion in the region. A PSInSAR analysis of Manchester was performed by Fugro NPA Ltd [NPA1] and the ISBAS analysis appears to be in agreement with those results where they occur, in urban areas.

Figure 15A:
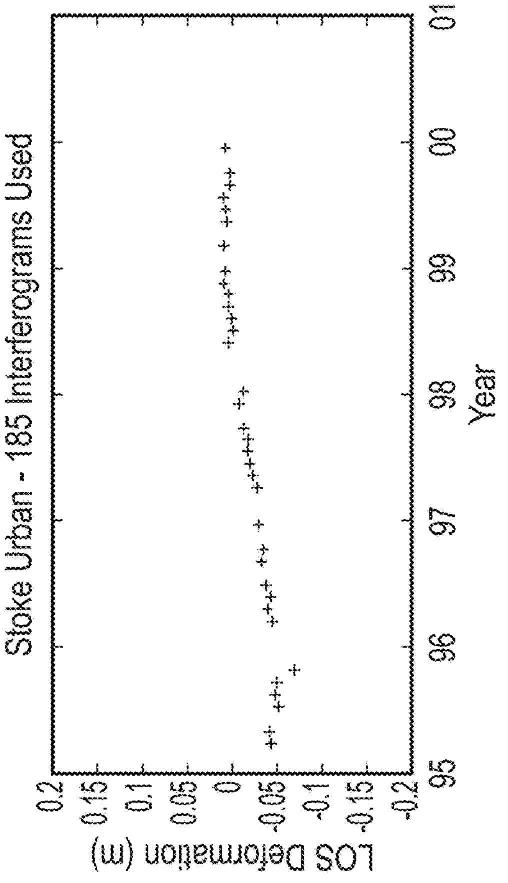
Figure 15B:
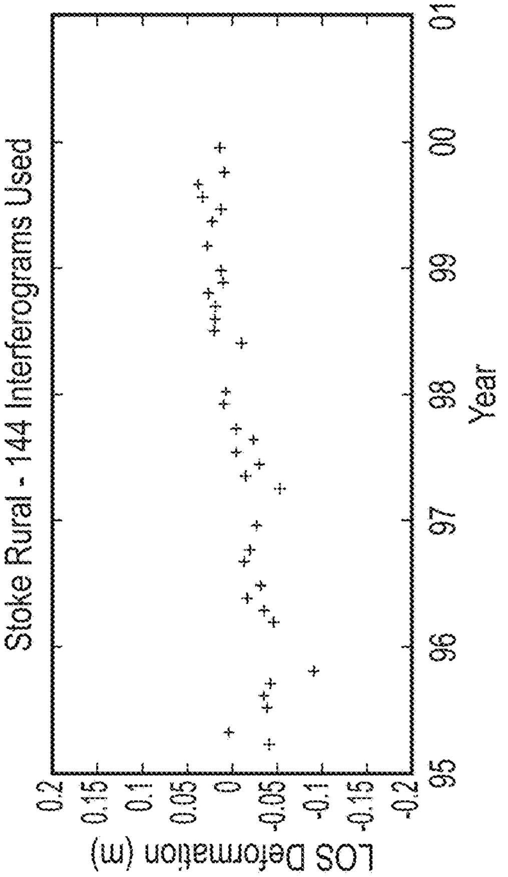
Figure 15C:
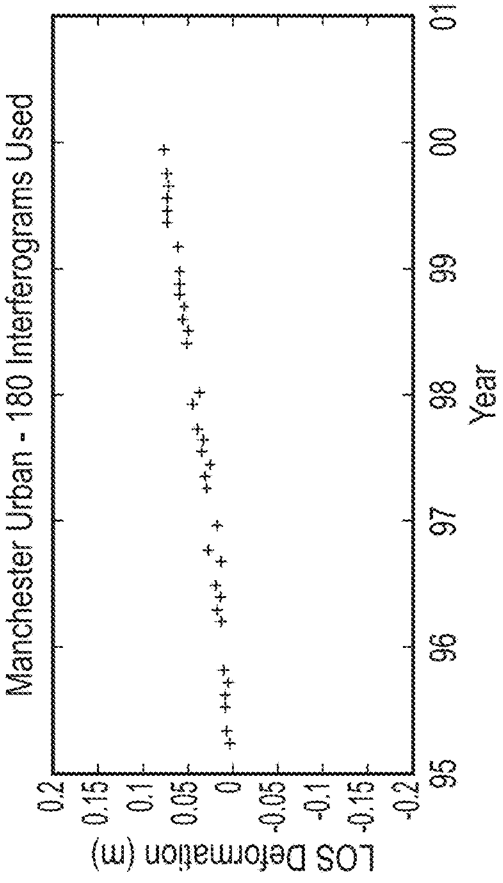
Figure 15D:
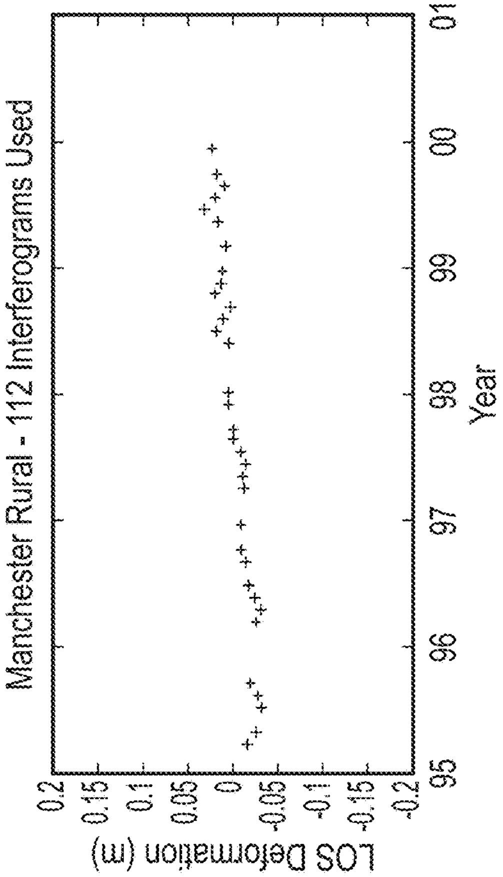

Considering Stoke on Trent, two points identified as A and A' in FIG. 13*a* identify regions that appear to originate from the same region of uplift but point A is in an urban area and point A' is in a rural location. The non-linear deformation profiles of each of the points are illustrated in FIGS. 15*a* and 15*b*. It is clear from this that both profiles have similar characteristics in terms of trend. The rural signature, however, is more noisy, with what appears to be an annual variation in the signature. FIGS. 15*c* and 15*d* show the results of a similar analysis for points B and B' in FIG. 14*a*, from urban and rural classes respectively. The time series of these two points are very similar although, as with Stoke on Trent, the rural signature is noisy (although less so), again with a similar annual variation but of a smaller amplitude.

In the rural classes, the signatures are more complex than those of the urban points, displaying the same overall trend but with additional variations of what appears to be a yearly period. A dominant influence is likely to be soil shrink-swell and moisture, both of which are heavily influenced by annual variations in temperature and rainfall. Point A' falls in an agricultural area and point B' falls in an area of pasture, which could contribute to the difference in the amplitudes of the periodic signal. It is likely that any strong annual signature could be removed by a suitable filter to determine the underlying trend, if the period of SAR observations is sufficiently longer than a single year.

In summary, the ISBAS method has been demonstrated over a full ERS frame of the north-west of England, resulting in the land area covered by the analysis increasing from 8% in the SBAS case to 86%. A LOS deformation map for the whole area was generated using a single reference point and showed coal mining-related uplift and subsidence in Manchester and Stoke on Trent, which both agreed with previous analyses using persistent scatterers interferometry. The time series of the LOS deformations also appear consistent with ground observations, although tend to be more noisy for rural points where there may be a phase contribution from the land cover class itself.

Other embodiments are intentionally within the scope of the invention as defined by the appended claims.

REFERENCES

U. Wegmüller and C. L. Werner, SAR Interferometric Signatures of Forest, IEEE Transactions on Geoscience and Remote Sensing, vol. 33, no. 5, pp. 1153-1161. September 1995

J. O. Hagberg, L. M. H. Ulander, J. Askne, Repeat-Pass SAR Interferometry Over Forested Terrain, IEEE Transactions on Geoscience and Remote Sensing, vol. 33, no. 2, pp. 331-340 March 1995.

H. A. Zebker, J. Villasenor, Decorrelation in Interferometric Radar Echoes, IEEE Transactions on Geoscience and Remote Sensing, vol. 30, no. 3, pp. 560. May 1992

J. Askne, M. Santoro, G. Smith, and J. Fransson, Multitemporal Repeat-Pass SAR Interferometry of Boreal Forests, IEEE Transactions on Geoscience and Remote Sensing, Vol. 41. No. 7. July 2003

P. Berardino, G. Fornaro, R. Lanari, and E. Sansosti, A new algorithm for surface deformation monitoring based on small baseline differential SAR interferograms, IEEE Trans. Geosci. Remote Sens., vol. 40, no. 11, pp. 2375-2383, November 2002. DOI: 10.1109/TGRS.2002.803792.

T. R. Lauknes, H. A. Zebker and Y. Larsen, InSAR deformation time series using an L1-norm small-baseline approach, IEEE Trans. Geosci. Remote Sens., vol. 49, no. 1, pp. 536-546, January 2011, DOI: 10.1109/TGRS.2010.2051951.

A. Sowter, L. Bateson, P. Strange, K. Ambrose and M. Syafiudin, DInSAR estimation of land motion using intermittent coherence with application to the South Derbyshire and Leicestershire coalfields, Remote Sensing Letters, vol. 4 no. 10, pp. 979-987. 2013. DOI:10.1080/2150704X.2013.823673

A. Ferretti, A. Fumagalli, F. Novali, C. Prati, F. Rocca, and A. Rucci, A New Algorithm for Processing Interferometric Data-Stacks: SqueeSAR, IEEE Trans. Geosci. Remote Sens., vol. 49, no. 9, pp. 3460-3470, September 2011. DOI: 10.1109/TGRS.2011.2124465.

A. Jarvis, H. I. Reuter, A. Nelson, E. Guevara, 2008, Hole-filled SRTM for the globe Version 4, available from the CGIAR-CSI SRTM 90 m Database (http://srtm.csi.egiar.org).

L. Donnelly, A review of coal mining induced fault reactivation in Great Britain, Quarterly Journal of Engineering Geology and Hydrogeology, vol. 39, pp. 5-50, 2006. DOI: 10.1144/1470-9236/05-015.

EEA, 2014 (http://www.ea.europa.eu/data-and-maps/data/corine-land-cover-2000-raster-3).

M. Culshaw, D. Tragheim, L. Bateson and L. Donnelly, Measurement of ground movements in Stoke-on-Trent (UK) using radar interferometry, Proceedings of the 10th IAEG International Congress, 6-10 Sep. 2006, Nottingham, UK.

A. Pepe and R. Lanari, On the Extension of the Minimum Cost Flow Algorithm for Phase Unwrapping of Multitemporal Differential SAR Algorithms, IEEE Trans. Geosci. Remote Sens., vol. 44, no. 9, pp. 2374-2383, September 2006. DOI: 10.1109/TGRS.2006.873207.

NPA1, https://www.envirocheck.co.uk/image/uploads/Fugro_NPA_Case_Study_1.pdf, last accessed 2 Jul. 2014.

D. Massonnet, K. L. Feigl. Radar interferometry and its application to changes in the earth's surface, Rev. Geophys, vol. 36, no. 4, pp. 441-500, 1998.

M. Crosetto, O. Monserrat, R. Iglesias, and B. Crippa. Persistent Scatterer Interferometry: potential, limits and initial C- and X-band comparison, Photogram. Eng. Remote Sens., vol. 76, pp. 1061-1069.2010.

F. Cigna, L. Bateson, C. Jordan, and C. Dashwood. Simulating SAR geometric distortions and predicting Persistent Scatterer densities for ERS-1/2 and ENVISAT C-band SAR and InSAR applications: nationwide feasibility assessment to monitor the landmass of Great Britain with SAR imagery. Remote Sensing of Environment, vol. 152. pp. 441-466, 2014. DOI: 10.1016/j.rse.2014.06.025.

L. Bateson, F. Cigna, D. Boon and A. Sowter. The application of the Intermittent SBAS (ISBAS) InSAR method to the South Wales Coalfield, UK. International Journal of Applied Earth Observation and Geoinformation, Volume 34, February 2015, Pages 249-257. DOI: 10.1016/j.jag.2014.08.018

M. Crosetto, O. Monserrat, N. Adam, A. Parizzi, C. Bremmer, S. Dortland, R. F. Hanssen, and F. J. van Leijen. Final report of the validation of existing processing chains in Terrafirma stage 2. Terrafirma project. ESRIN/Contract no. 19366/05/I-E. [Online], 2008. Available: http://www.terrafirma.eu.com/product_validation.htm D. Gee, A. Sowter, A. Novellino, S. Marsh and J. Gluyas. Monitoring land motion due to natural gas extraction: Validation of the Intermittent SBAS (ISBAS) DInSAR algorithm over gas fields of North Holland, the Netherlands. Marine and Petroleum Geology 77 (2016) 1338-1354. http://dx.doi.org/10.1016/j.marpetgeo.2016.08.014

The invention claimed is:

1. A method of deriving a map of land deformation from synthetic aperture data, the method comprising the following acts performed by a computer:

acquiring a plurality of synthetic aperture radar images covering an area of interest at different points in time;

deriving a plurality of interferograms from pairs of the synthetic aperture radar images, each interferogram comprising a measure of phase difference between pixels of a respective pair of synthetic aperture radar images;

for each pixel of the plurality of interferograms:

determining an average coherence value over all of the interferograms; and if the average coherence value for that pixel is less than a preset coherence threshold, determining an adjusted average coherence value for that pixel equal to or above the preset coherence threshold by excluding a coherence value for that pixel of one or more of the interferograms in which the coherence value is below the preset coherence threshold, provided that the number of remaining interferograms over which the average coherence value is determined is not less than a preset minimum number of interferograms;

for each pixel of each interferogram for which the average or adjusted average coherence value is above the preset coherence threshold, deriving a measure of vertical movement from the measure of phase difference; and deriving a map of land deformation from the measure of vertical movement for each pixel.

2. The method of claim 1 wherein the act of deriving a measure of vertical movement from the measure of phase difference comprises extracting phase information with respect to a common pixel in the plurality of interferograms for which the average coherence value over all of the interferograms is equal to or above the preset coherence threshold.

3. The method of claim 1 wherein the preset minimum number of interferograms is at least 50.

4. The method of claim 1 wherein the preset coherence threshold is greater than 0.2.

5. The method of claim 4 wherein the preset coherence threshold is 0.25 or more.

6. The method of claim 1 wherein the pixels of the plurality of interferograms each define an average phase difference between groups of pixels in the respective pair of synthetic aperture radar images.

7. The method of claim 6 wherein the groups of pixels are each in the form of a regular rectangular array.

8. The method of claim 1 wherein the act of determining an average coherence value over all of the interferograms comprises deriving a complex correlation coefficient between pixels of the respective pairs of synthetic aperture radar images for each pixel of each interferogram, the average coherence value over all of the interferograms being an average of the complex correlation coefficients of corresponding pixels from each interferogram.

9. The method of claim 1 wherein the plurality of interferograms include one or more pairs of synthetic aperture radar images taken around 12 months, or a multiple thereof, apart, plus or minus 3 months.

10. The method of claim 1 wherein the act of determining an adjusted average coherence value equal to or above the preset coherence threshold comprises repeating the act of determining an average coherence value after excluding the coherence value for the pixel of the interferogram in which the pixel has the lowest coherence value until the average coherence value is above the preset coherence threshold or until the number of remaining interferograms is less than a preset minimum number of interferograms.

11. The method of claim 1 wherein the measure of vertical movement from the measure of phase difference is derived with reference to a pixel having an average coherence value over all of the interferograms above the preset coherence threshold.

12. A non-transitory computer-readable medium comprising a computer program stored thereon comprising instructions which when executed by a computer configure the computer to perform a method comprising acts of:

acquiring a plurality of synthetic aperture radar images covering an area of interest at different points in time;

deriving a plurality of interferograms from pairs of the synthetic aperture radar images, each interferogram comprising a measure of phase difference between pixels of a respective pair of synthetic aperture radar images;

for each pixel of the plurality of interferograms:

determining an average coherence value over all of the interferograms; and if the average coherence value for that pixel is less than a preset coherence threshold, determining an adjusted average coherence value for that pixel equal to or above the preset coherence threshold by excluding a coherence value for that pixel of one or more of the interferograms in which the coherence value is below the preset coherence threshold, provided that the number of remaining interferograms over which the average coherence value is determined is not less than a preset minimum number of interferograms;

for each pixel of each interferogram for which the average or adjusted average coherence value is above the preset coherence threshold, deriving a measure of vertical movement from the measure of phase difference; and deriving a map of land deformation from the measure of vertical movement for each pixel.

* * * * *